United States Patent
Itoh et al.

(10) Patent No.: US 9,447,208 B2
(45) Date of Patent: *Sep. 20, 2016

(54) RUBBER COMPOSITION FOR TIRE, VULCANIZED RUBBER COMPOSITION FOR TIRE, AND TIRES USING SAME

(71) Applicant: BRIDGESTONE CORPORATION, Chuo-ku, Tokyo (JP)

(72) Inventors: Yuki Itoh, Kawasaki (JP); Masaki Yanagioka, Musashino (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/371,355

(22) PCT Filed: Jan. 10, 2013

(86) PCT No.: PCT/JP2013/000059
§ 371 (c)(1),
(2) Date: Jul. 9, 2014

(87) PCT Pub. No.: WO2013/105502
PCT Pub. Date: Jul. 18, 2013

(65) Prior Publication Data
US 2014/0357804 A1 Dec. 4, 2014

(30) Foreign Application Priority Data
Jan. 10, 2012 (JP) .................. 2012-002574

(51) Int. Cl.
*C08F 36/06* (2006.01)
*C08K 3/36* (2006.01)
*C08C 19/44* (2006.01)
*B60C 1/00* (2006.01)

(52) U.S. Cl.
CPC ............. *C08F 36/06* (2013.01); *B60C 1/0016* (2013.04); *C08C 19/44* (2013.01); *C08K 3/36* (2013.01); *C08F 2810/00* (2013.01); *C08K 2201/006* (2013.01)

(58) Field of Classification Search
CPC ...... C08K 3/36; C08F 297/044; C08F 36/06; C08F 36/08; C08C 19/25; B60C 1/00
See application file for complete search history.

(56) References Cited

U.S. PATENT DOCUMENTS

| | | | |
|---|---|---|---|
| 9,221,962 B2 * | 12/2015 | Yanagioka | B60C 1/0016 |
| 2005/0004297 A1 | 1/2005 | Durel et al. | |
| 2011/0046263 A1 * | 2/2011 | Hoshino et al. | 523/152 |
| 2012/0270997 A1 | 10/2012 | Tanaka et al. | |

FOREIGN PATENT DOCUMENTS

| | | |
|---|---|---|
| CN | 1541245 A | 10/2004 |
| CN | 1592760 A | 3/2005 |
| EP | 0795578 A2 | 9/1997 |
| EP | 2272909 A1 | 1/2011 |
| EP | 2592110 A1 | 5/2013 |
| JP | 8-48818 A | 2/1996 |
| JP | 10-194723 A | 7/1998 |
| JP | 11-228740 A | 8/1999 |
| JP | 11-236208 A | 8/1999 |
| JP | 11-240982 A | 9/1999 |
| JP | 2005-500420 A | 1/2005 |
| JP | 2007-138069 A | 6/2007 |
| JP | 2008-179675 A | 8/2008 |
| JP | 2008-308517 A | 12/2008 |
| JP | 2009-287019 A | 12/2009 |
| JP | 2010-241982 A | 10/2010 |
| JP | 2011-57946 A | 3/2011 |
| JP | 2011-89032 A | 5/2011 |
| JP | 2011-93989 A | 5/2011 |
| WO | 2011/049180 A1 | 4/2011 |

OTHER PUBLICATIONS

International Search Report for PCT/JP2013/000059 dated Apr. 16, 2013.
Chinese Office Action issued in corresponding CN Application No. 201380005207.1, dated Apr. 1, 2015.
Communication dated Oct. 20, 2015, from the Japanese Patent Office in counterpart application No. 2012-002574.
Quarch et al., "Mechanical fragmentation of precipitated silica aggregates", Chemical Engineering Research and Design (2010).
Supplementary European Search Report issued in EP Application No. 13735767.9, dated Jul. 20, 2015.
Communication dated Sep. 6, 2015 from the State Intellectual Property Office of the People's Republic of China in counterpart Application No. 201380005207.1.

* cited by examiner

*Primary Examiner* — Kuo-Liang Peng
(74) *Attorney, Agent, or Firm* — Sughrue Mion, PLLC

(57) ABSTRACT

An object of the present invention is to provide a rubber composition for a tire, capable of achieving both good rolling resistance properties and good wear resistance in a sufficiently compatible manner when the rubber composition is applied to a component member of a tire. Specifically, the present invention provides a rubber composition comprising a rubber composition and hydrated silica, wherein "CTAB" ($m^2$/g) as specific surface area by cetyltrimethylammonium bromide adsorption and "IB" as ink bottle-shaped micropore index, of the hydrated silica, satisfy a specific relationship and "weight loss on ignition" as weight loss when the hydrate silicate is heated at 750° C. for 3 hours and "weight loss on heating" as weight loss when the hydrate silicate is heated at 105° C. for 2 hours satisfy a specific relationship.

13 Claims, 2 Drawing Sheets

RUBBER COMPOSITION FOR TIRE, VULCANIZED RUBBER COMPOSITION FOR TIRE, AND TIRES USING SAME

TECHNICAL FIELD

The present invention relates to a rubber composition for a tire, capable of achieving both good rolling resistance properties and good wear resistance in a sufficiently compatible manner when the rubber composition is applied to a component member of a tire. The present invention also relates to a vulcanized rubber composition obtained by vulcanizing the rubber composition and a tire using the (vulcanized) rubber composition.

BACKGROUND ART

A pneumatic tire is generally required to have high capacity of simultaneously satisfying various requirements of plural, different performances. In particular, a component member of a tire such as tread is keenly required to achieve both good rolling resistance properties and good wear resistance in a compatible manner. However, there have been quite a few trial-and-errors in the prior art in this connection because good rolling resistance properties and good wear resistance are basically inconsistent with each other.

Hydrated silica has been used as one of reinforcement fillers in a rubber composition applied to tire tread. In general, increase in content of reinforcement filers blended in a tire improves wear resistance of the tire to some extent but possibly deteriorates rolling resistance properties thereof and may result in poor workability due to too high viscosity of unvulcanized rubber in some applications.

In view of this, there has been developed a technique of improving dispersibility of hydrated silica particle into rubber components of a tire by employing hydrated silica having large-size primary particles, to improve rolling resistance properties of the tire. In this connection, Patent Literature 1, which noticed that use of hydrated silica having large-size primary particles possibly deteriorates storage modulus of a tire, discloses a technique of using hydrated silica of which coagulation force and the like have been controllably modified in order to improve storage modulus and reduce heat generation of a tire, with maintaining good dispersibility of hydrated silica.

CITATION LIST

Patent Literature

PTL 1: JP 2007-138069

SUMMARY OF THE INVENTION

Technical Problems

In a case where hydrated silica having large-size primary particles is used, however, not only storage modulus of a tire may deteriorate as described above but also wear resistance of the tire may be degraded, although rolling resistance properties of the tire improve to some extent. Further, if the hydrated silica having large-size primary particles is replaced with hydrated silica of which coagulation force and the like have been controllably modified, there still remains room for improvement in terms of achieving both good rolling resistance properties and good wear resistance of a tire in a compatible manner.

Particles of hydrated silica each generally have at the outer surface thereof numerous micropores with openings and these micropores involve adsorption of chains of rubber molecules. It is therefore assumed that configurations of micropores of hydrated silica particles closely relate to and thus control thereof could make significant contribution to improving rolling resistance properties and wear resistance of a tire. Configurations of micropores of hydrated silica particles need to be appropriately specified in this regard.

In view of the facts described above, an object of the present invention is to provide: a rubber composition for a tire, capable of achieving good wear resistance without deteriorating rolling resistance properties when the rubber composition is applied to a component member, e.g. tread, of a tire; a cross-linked rubber composition for tire obtained by cross-linking the rubber composition; and a pneumatic tire using the (vulcanized) rubber composition.

Solution to the Problems

The inventors of the present invention, as a result of a study to solve the aforementioned problems, discovered that these problems can be solved by blending a rubber composition with: hydrated silica having specific physical properties involving configurations of micropores with openings formed at the outer surface of each particle of the hydrated silica; and a modified polymer reactive to the hydrated silica, thereby completing the present invention.

Primary features of the present invention, contrived based on the discoveries described above, are as follows.

(1) A rubber composition for a tire, comprises:
a rubber component; and
a hydrated silica having particles each provided with micropores with openings in the range of $1.2 \times 10^5$ nm to 6 nm formed at outer surface of the particle,
wherein the rubber component contains a modified polymer reactive to the hydrated silica, and
in measurement according to a mercury press-in method using a mercury porosimeter of the hydrated silica, provided that:

"M1" (nm) represents diameter of the opening exhibiting the maximum value of mercury charge rate when pressure is increased from 1 PSI to 32000 PSI;

"M2" (nm) represents diameter of the opening exhibiting the maximum value of mercury discharge rate when pressure is decreased from 32000 PSI to 1 PSI;

"IB" represents "ink bottle-shaped micropore index";

$$IB = M2 - M1 \tag{X}$$

"CTAB" ($m^2/g$) represents specific surface area by cetyl-trimethylammonium bromide adsorption;

"weight loss on ignition" (mass %) represents weight loss when the hydrate silicate is heated at 750° C. for 3 hours; and "weight loss on heating" (mass %) represents weight loss when the hydrate silicate is heated at 105° C. for 2 hours, IB and CTAB satisfy following formula (I) and formula (II) and "weight loss on ignition" and "weight loss on heating" satisfy formula (III).

$$IB \leq -0.56 \times CTAB + 110.4 \text{ (when } CTAB \leq 140) \tag{I}$$

$$IB \leq -0.20 \times CTAB + 60.0 \text{ (when } CTAB > 140) \tag{II}$$

$$(\text{"weight loss on ignition"} - \text{"weight loss on heating"}) \geq 2.5 \text{ (mass \%)} \tag{III}$$

(2) The rubber composition for a tire of (1) above, wherein a specific surface area by cetyltrimethylammonium bromide adsorption (CTAB) of the hydrated silica is in the range of 50 m²/g to 300 m²/g.

(3) The rubber composition for a tire of (1) above, wherein the modified polymer is a modified conjugated diene-based polymer obtainable by: preparing a conjugated diene-based polymer having a metal-binding active site by anionic polymerization of a diene-based monomer and optionally other monomers in a hydrocarbon solvent using an alkali metal initiator or an alkali earth metal initiator; and reacting the metal-binding active site of the conjugated diene-based polymer with a hydrocarbyloxy silane compound.

(4) The rubber composition for a tire of (3) above, wherein the modified conjugated diene-based polymer has a functional group introduced thereto, the functional group being at least one functional group selected from hydroxysilyl group, alkoxysilyl group, trialkylsilyl group, amino group, and a halogen atom.

(5) The rubber composition for a tire of (4) above, wherein the functional group is selected from alkoxysilyl group and amino group.

(6) The rubber composition for a tire of (1) above, wherein the modified polymer is a modified conjugated diene polymer having at a terminal end of a molecule thereof a silanol group and a functional group facilitating a reaction between the silanol group and the hydrated silica.

(7) The rubber composition for a tire of (6) above, wherein the modified conjugated diene polymer is obtainable by a process of preparing a conjugated diene polymer having an active site and reacting the active site of the conjugated diene polymer with an organic silane compound represented by general formula (XIII) or general formula (XIV).

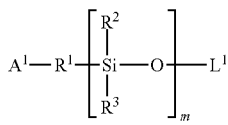

(XIII)

In general formula (XIII), $R^1$ is a single bond or a $C_{1-20}$ divalent hydrocarbon group; $R^2$ and $R^3$ each independently represent a hydrogen atom or a $C_{1-20}$ monovalent hydrocarbon group; —$OL^1$ represents a hydrolyzable functional group capable of generating, together with Si, a silanol group through hydrolysis thereof; $A^1$ represents a functional group capable of coupling the organic silane compound with the conjugated diene polymer through addition reaction or substitution reaction at the active site of the conjugated diene polymer and facilitating, after the coupling reaction, a reaction between the silanol group and the hydrated silica as a reinforcing filler, and m is an integer in the range of 1 to 10.

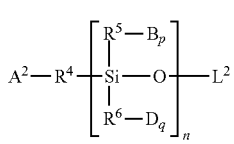

(XIV)

In general formula (XIV), $R^4$ is a single bond or a $C_{1-20}$ hydrocarbon group; $R^5$ and $R^6$ each independently represent a single bond, a hydrogen atom or a $C_{1-20}$ hydrocarbon group; —$OL^2$ represents a hydrolyzable functional group capable of generating, together with Si, a silanol group through hydrolysis thereof; $A^2$ represents a functional group reactive to the active site or a functional group capable of coupling the organic silane compound with the conjugated diene polymer through addition reaction or substitution reaction at the active site of the conjugated diene polymer; B and D each independently represent a group including at least one functional group facilitating a reaction between the silanol group and the hydrated silica as a reinforcing filler, p and q each independently represent an integer in the range of 0 to 5, provided that (p+q)>1; and n is an integer in the range of 1 to 10.

(8) The rubber composition for a tire of (7) above, wherein the modified conjugated diene polymer is represented by general formula (XI) or general formula (XII).

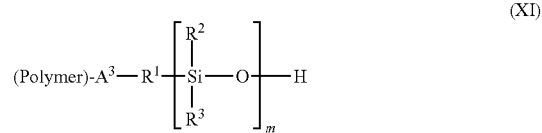

(XI)

In general formula (XI), $R^1$ is a single bond or a $C_{1-20}$ divalent hydrocarbon group; $R^2$ and $R^3$ each independently represent a hydrogen atom or a $C_{1-20}$ monovalent hydrocarbon group; $A^3$ represents a functional group facilitating a reaction between the silanol group and the hydrated silica; and m is an integer in the range of 1 to 10.

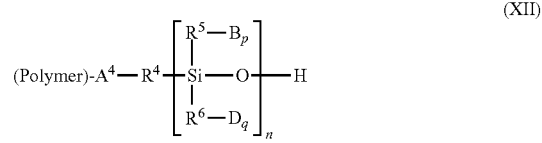

(XII)

In general formula (XIV), $R^4$ is a single bond or a $C_{1-20}$ hydrocarbon group; $R^5$ and $R^6$ each independently represent a single bond, a hydrogen atom or a $C_{1-20}$ hydrocarbon group; $A^4$ represents a single bond, a $C_{1-20}$ hydrocarbon group or a functional group facilitating a reaction between the silanol group and the hydrated silica; B and D each independently represent a group including at least one functional group facilitating a reaction between the silanol group and the hydrated silica; p and q each independently represent an integer in the range of 0 to 5, provided that (p+q)≥1; and n is an integer in the range of 1 to 10.

(9) The rubber composition for a tire of (8) above, wherein in general formulae (XI) and (XII) the functional group $A^3$ and the functional group $A^4$, each facilitating a reaction between the silanol group and the hydrated silica, each independently represent at least one type of divalent functional group selected from the group consisting of: a divalent functional group having at least one type of bond selected from ether bond, thioether bond, urethane bond, thiourethane bond, imino bond, and amido bond; and a divalent functional group derived from a functional group selected from nitrile group, pyridyl group, N-alkylpyrrolidonyl group. N-alkylimidazolyl group, N-alkylpyrazolyl group, ketone group, thioketone group, aldehyde group, thioaldehyde group, a residual group of isocyanuric acid triester, a residual group of $C_{1-20}$ carboxylic acid hydrocarbyl ester or $C_{1-20}$ thiocarboxylic acid hydrocarbyl ester, a residual group of $C_{1-20}$ carboxylic acid metal salt or $C_{1-20}$ thiocarboxylic acid metal salt, a residual group of $C_{1-20}$ carboxylic acid anhydride, a residual group of $C_{1-20}$ carboxylic acid halide, and a residual group of $C_{1-20}$ carbonic acid dihydrocarbyl ester.

(10) The rubber composition for a tire of (8) above, wherein in general formula (XII) B and D, each including at least one functional group facilitating a reaction between the silanol group and the hydrated silica, each independently represent at least one type of functional group selected from the group consisting of primary amino group, secondary amino group, protected primary/secondary amino group, tertiary amino group, cyclic amino group, oxazolyl group, imidazolyl group, aziridinyl group, ketone group, thioketone group, aldehyde group, thioaldehyde group, thioamido group, epoxy group, thioepoxy group, iscyanate group, thioisocyanate group, nitrile group, pyridyl group, N-alkylpyrrolidonyl group, N-alkylimidazolyl group, N-alkylpyrazolyl group, imino group, amido group, ketimine group, a residual group of imine, a residual group of isocyanuric acid triester, a residual group of $C_{1-20}$ carboxylic acid hydrocarbyl ester or $C_{1-20}$ thiocarboxylic acid hydrocarbyl ester, a residual group of $C_{1-20}$ carboxylic acid metal salt or $C_{1-20}$ thiocarboxylic acid metal salt, a residual group of $C_{1-20}$ carboxylic acid anhydride, a residual group of $C_{1-20}$ carboxylic acid halide, and a residual group of $C_{1-20}$ carbonic acid dihydrocarbyl ester, and a functional group represented by general formula: -E-F-G, wherein E represents imino group, divalent residual group of imine, divalent residual group of pyridine or divalent residual group of amido, F represents $C_{1-20}$ alkylene group, phenylene group or $C_{1-20}$ aralkylene group, and G represents primary amino group, secondary amino group, protected primary/secondary amino group, tertiary amino group, cyclic amino group, oxazolyl group, imidazolyl group, aziridinyl group, ketimine group, nitrile group, amido group, pyridine group, isocyanate group or thioisocyanate group.

(11) The rubber composition for a tire of (8) above, wherein the conjugated diene polymer constituting the modified conjugated diene polymer is polybutadiene, polyisoprene, butadiene-isoprene copolymer, styrene-butadiene copolymer, styrene-isoprene copolymer, or styrere-isoprene-butadiene terpolymer.

(12) A cross-linked rubber composition for a tire, obtainable by subjecting the rubber composition of (1) above to a crosslinking process.

(13) A tire, using as a material the rubber composition of (1) above or the cross-linked rubber composition of (12) above.

Advantageous Effect of the Invention

The rubber composition of the present invention is blended with hydrated silica having specific physical properties involving configurations of micropores with openings formed at the outer surface of each particle of the hydrated silica. Accordingly, a tire using the rubber composition can exhibit excellent rolling resistance properties and excellent wear resistance in a compatible manner. That is, a high-performance pneumatic tire can be realized by applying the rubber composition to a component member of the tire.

DESCRIPTION OF THE EMBODIMENTS

<Rubber Composition for Tire>

Figure 1:
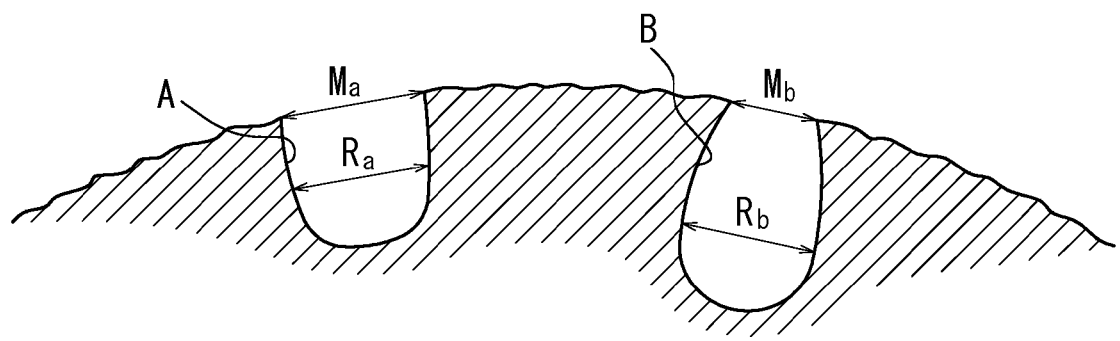
FIG. 1 is a cross-sectional (and partly enlarged) view in the radial direction of a particle of hydrated silica of the present invention.

A rubber composition for a tire of the present invention will be described in detail with reference to the drawings hereinafter.

The rubber composition for a tire of the present invention contains a rubber component and hydrated silica.

Further, the rubber composition for a tire of the present invention is characterized in that (i) the hydrated silica has particles each provided with micropores with openings in the range of $1.2 \times 10^5$ nm to 6 nm formed at outer surface of the particle, (ii) the rubber component contains a modified polymer reactive to the hydrated silica, and (iii) in measurement according to a mercury press-in method using a mercury porosimeter of the hydrated silica, provided that: "M1" (nm) represents diameter of the opening exhibiting the maximum value of mercury charge rate when pressure is increased from 1 PSI to 32000 PSI; "M2" (nm) represents diameter of the opening exhibiting the maximum value of mercury discharge rate when pressure is decreased from 32000 PSI to 1 PSI; "IB" represents "ink bottle-shaped micropore index"; IB=M2−M1 . . . (X); "CTAB" ($m^2/g$) represents specific surface area by cetyltrimethylammonium bromide adsorption; "weight loss on ignition" (mass %) represents weight loss when the hydrate silicate is heated at 750° C. for 3 hours; and "weight loss on heating" (mass %) represents weight loss when the hydrate silicate is heated at 105° C. for 2 hours, IB and CTAB satisfy following formula (I) and formula (II) and "weight loss on ignition" and "weight loss on heating" satisfy formula (III).

$$IB \leq -0.56 \times CTAB + 110.4 \text{ (when CTAB} \leq 140) \qquad (I)$$

$$IB \leq -0.20 \times CTAB + 60.0 \text{ (when CTAB} > 140) \qquad (II)$$

("weight loss on ignition"−"weight loss on heating")>2.5 (mass %) \qquad (III)

In short, the hydrated silica of the present invention has been optimized such that particles thereof have the reduced number of micropores having ink bottle-shaped configurations and the increased number of micropores having substantially cylindrical configurations when viewed in cross sections in inner core directions of the particles. Accordingly, entry of rubber molecular chains into micropores of the hydrated silica is facilitated to cause a satisfactory reinforcing effect, which successfully contributes to improving wear resistance of a tire without deteriorating rolling resistance properties thereof.

Further, since the rubber component contains the modified polymer reactive to the hydrated silica, good effects of chemical adsorption and chemical binding between the reactive modified polymer and functional groups at surfaces of the hydrated silica, as well as an effect of physical adsorption between the modified polymer and the hydrated silica, are caused, which further improve the hydrated silica-dispersion effect and the reinforcing hardening effect by the hydrated silica described above in the present invention.

(Hydrated Silica)

With regard to the hydrated silica contained in the rubber composition for a tire of the present invention, provided that "IB" represents "ink bottle-shaped micropore index determined as described above in measurement of the hydrated silica by using a mercury porosimeter and "CTAB" ($m^2/g$) represents specific surface area by cetyltrimethylammonium bromide adsorption, IB and CTAB satisfy following formula (I) and formula (II) with regard to the hydrated silica.

$$IB \leq -0.56 \times CTAB + 110.4 \text{ (when } CTAB \leq 140\text{)} \quad (I)$$

$$IB \leq -0.20 \times CTAB + 60.0 \text{ (when } CTAB > 140\text{)} \quad (II)$$

"Specific surface area by cetyltrimethylammonium bromide adsorption" (CTAB) ($m^2/g$) represents a value measured according to ASTM D3765-92 in the present invention. It should be noted, however, that ASTM D3765-92 is basically a method for measuring CTAB of carbon black and therefore the present invention specifically includes: preparing cetyltrimethylammonium bromide (which will be referred to as "CE-TRAB" hereinafter) standard solution in place of "IRB#3" (83.0 $m^2/g$) as the standard solution according to ASTM D3765-92; carrying out standardization of hydrated silica OT (sodium di-2-ethylhexyl sulfosuccinate) solution by using the CE-TRAB standard solution; assuming that cross sectional area per one CE-TRAB molecule adsorbed on the hydrated silica surface is 0.35 $nm^2$; and regarding a specific surface area ($m^2/g$) calculated from an amount of CE-TRAB adsorption based on the aforementioned assumption as a value of CTAB. The aforementioned specific steps are required in the present invention because carbon black and hydrated silica, having different surface characteristics therebetween, presumably exhibit difference in amount of CE-TRAB adsorption, as well, even if they share the same surface area.

Further, in the present invention, "ink bottle-shaped micropore index" (IB) is defined by the following formula $$IB = M2 - M1 \quad (X)$$

provided, in measurement according to a mercury press-in method using a mercury porosimeter of a hydrated silica, that: the hydrated silica has particles each provided with micropores with openings in the range of $1.2 \times 10^5$ nm to 6 nm formed at outer surface of the particle; "M1" (nm) represents diameter of the opening exhibiting the maximum value of mercury charge rate when pressure is increased from 1 PSI to 32000 PSI; and "M2" (nm) represents diameter of the opening exhibiting the maximum value of mercury discharge rate when pressure is decreased from 32000 PSI to 1 PSI. Measurement using a mercury porosimeter according to a mercury press-in method is useful because it is not only simpler and easier than measurement using an electron microscope often employed in the prior art in evaluation of micropore morphology but also excellent in quantitativity.

In general, particles of hydrated silica are each provided with a number of micropores as recessed portions with openings formed at outer surface of the particle. FIG. 1 shows a schematic view of configurations of such micropores as described above at a cross section in the radial direction of a particle of hydrated silica. Micropores seen as recessed portions at a cross section in the radial direction of a hydrated silica particle have various shapes. For example, type A micropore has a configuration in which diameter $M_a$ of an opening portion at the outer surface of a particle is substantially equal to micropore diameter at the interior of the particle (the inner diameter) $R_a$, i.e. a substantially cylindrical configuration, at a cross section in the radial direction of the particle. On the other hand, type B micropore has a configuration in which diameter $M_b$ of an opening portion at the outer surface of a particle is smaller than micropore diameter at the interior of the particle (the inner diameter) $R_b$, i.e. an ink bottle-like configuration, at a cross section in the radial direction of the particle. In a case of type B micropore having an ink bottle-shaped configuration at a cross section in the radial direction of a particle of hydrated silicon, molecular chains of rubber do not smoothly enter the micropore from the outer surface toward the interior of the particle and molecular chains of rubber fail to be sufficiently adsorbed when the hydrated silicon is blended with a rubber component, whereby rolling resistance properties of a resulting tire may deteriorate and improvement of wear resistance of the tire may be disturbed due to an insufficient reinforcing effect by the hydrated silica. In other words, entry of rubber molecular chains is efficiently facilitated and thus a sufficient reinforcing effect of the hydrated silica can be demonstrated to contribute to improvement of wear resistance of a tire without deteriorating rolling resistance properties thereof by decreasing the number of ink bottle-shaped type B micropores and increasing the number of substantially cylindrical type A micropores of hydrated silica particles.

In view of this, the aforementioned "ink bottle-shaped micropore index" (IB) regarding hydrated silica to be blended with a rubber component is specified as described above in order to decrease the number of type B micropores having ink bottle-shaped configurations in a cross section in the radial direction of a hydrated silica particle in the present invention. In the measurement using a mercury porosimeter according to a mercury press-in method described above, mercury is relatively easily charged into the inner portion of type A micropore having substantially cylindrical configuration when pressure is increased because an opening thereof formed at the outer surface of a particle is widely open to the exterior, while mercury is less easily charged into the inner portion of type B micropore having ink bottle-shaped configuration than in type A micropore when pressure is increased because an opening of type B micropore formed at the outer surface of a particle is less opened to the exterior than that of type A micropore. On the other hand, mercury is relatively easily discharged from the inner portion of type A micropore having substantially cylindrical configuration toward the exterior of the micropore when pressure is decreased, while mercury is less easily discharged from the inner portion of type B micropore having ink bottle-shaped configuration toward the exterior of the micropore when pressure is decreased for the same reasons as described above.

Figure 2:
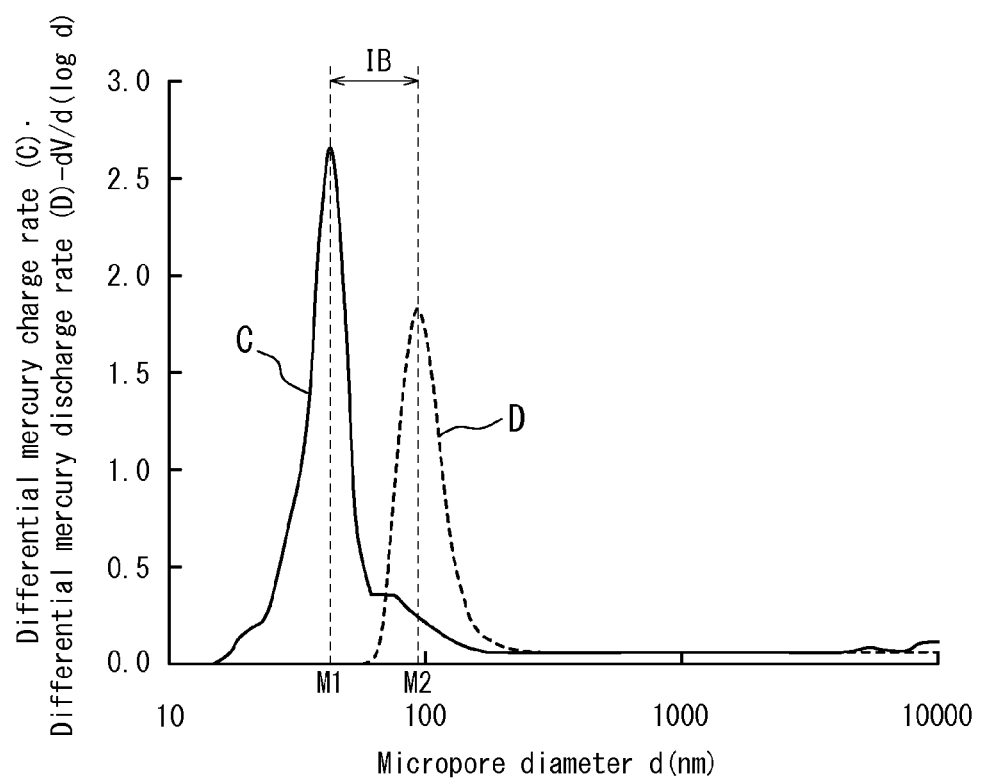
FIG. 2 is a graph schematically showing charge and discharge curves of mercury into/from the hydrated silica in measurement according to a mercury press-in method using a mercury porosimeter. The Y-axis of the graph represents differential mercury charge rate (–dV/d(log d)) in the mercury charge curve C and differential mercury discharge rate (–dV/d(log d)) in the mercury discharge curve D. "V" represents an amount of charged mercury (cc) in the mercury charge curve C and an amount of discharged mercury (cc) in the mercury discharge curve D, respectively. The X axis of the graph represents "d" (nm) as diameter (nm) of an opening of a micropore of a particle of the hydrated silica.

Accordingly, there is generated hysteresis in mercury charge and discharge curves C, D in measurement according to a mercury press-in method using a mercury porosimeter, as shown in FIG. 2. Specifically, mercury is readily charged into type A micropores having substantially cylindrical configurations at relatively low pressure and then, when pressure has reached a certain value, mercury bursts into other micropores than type A micropores, such as type B micropores having ink bottle-shaped configurations, which are less accessible for mercury than type A micropores. As a result, charge rate rapidly increases and mercury charge curve C as shown in FIG. 2 is plotted when the Y-axis of the graph represents differential mercury charge rate (−dV/d(log d)) and the X-axis of the graph represents diameter M (nm) of an opening of a micropore of a particle of hydrated silica. On the other hand, when pressure is decreased after having been sufficiently increased, a state where mercury is not easily discharged is maintained under relatively high pressure and, when pressure has dropped to a certain value, mercury charged in micropores bursts into the exterior of the micropores. As a result, discharge rate rapidly increases and mercury discharge curve D as shown in FIG. 2 is plotted when the Y-axis of the graph represents differential mercury discharge rate (−dV/d(log d)) and the X-axis of the graph represents diameter M (nm) of an opening of a micropore of a particle of the hydrated silica. Mercury once charged into micropores tends to remain in a state where it is not easily discharged when pressure decreases, whereby increase in discharge rate is observed, when pressure decreases, at a position in the graph corresponding to a diameter (M2) larger than a diameter (M1) at which increase in charge rage occurs when pressure increases. "IB" shown in FIG. 2 corresponds to difference in these two diameters, i.e. (M2−M1). The tendency that mercury once charged in micropores is not easily discharged is conspicuous in type B micropores having ink bottle-shaped configurations in particular. Mercury charged in type B micropores at certain high pressure is then hardly discharged toward the exterior of the micropores at the same certain high pressure when pressure is decreased.

IB as difference between M1 and M2, determined according to the aforementioned formula (X) by employing the aforementioned measuring method and utilizing mercury charge and discharge curves C, D plotted based on characteristics of micropores, provided that: "M1" (nm) represents diameter of the opening exhibiting the maximum value of mercury charge rate when pressure is increased from 1 PSI to 32000 PSI in measurement using a mercury porosimeter according to a mercury press-in method; and "M2" (nm) represents diameter of the opening exhibiting the maximum value of mercury discharge rate when pressure is decreased from 32000 PSI to 1 PSI in the measurement, thus substantially represents a micropore index indicating presence ratio of type B micropores having ink bottle-shaped configurations present in hydrated silica, although IB apparently is difference in diameter (length: nm) between M1 and M2. Specifically, the smaller presence ratio of type B micropores having ink bottle-shaped configurations with sufficiently narrow openings results in the smaller difference between the mercury charge curve C and the mercury discharge curve D, i.e. the smaller IB value due to the smaller difference between the diameter (M1) of the opening exhibiting the maximum value of mercury charge rate and the diameter (M2) of the opening exhibiting the maximum value of mercury discharge rate. In contrast, the larger presence ratio of type B micropores having ink bottle-shaped configurations results in the larger difference between the mercury charge curve C and the mercury discharge curve D, i.e. the larger IB value due to the larger difference between the diameter (M1) of the opening exhibiting the maximum value of mercury charge rate and the diameter (M2) of the opening exhibiting the maximum value of mercury discharge rate.

IB described above characteristically changes in accordance with the aforementioned CTAB. IB tends to decrease as CTAB increases. Accordingly, the hydrated silica for use in the present invention is to satisfy the following formulae (I) and (II) with CTAB=140 (m²/g) as a borderline $$IB \leq -0.56 \times CTAB + 110.4 \text{ (when CTAB} \leq 140) \quad (I)$$

$$IB \leq -0.20 \times CTAB + 60.0 \text{ (when CTAB} > 140) \quad (II)$$

and preferably satisfies the following formulae (I-1) when CTAB≤140 and (II-1) when CTAB>140.

$$IB \leq -0.48 \times CTAB + 97.2 \text{ (when CTAB} \leq 140) \quad (I\text{-}1)$$

$$IB \leq -0.20 \times CTAB + 58.0 \text{ (when CTAB} > 140) \quad (II\text{-}1)$$

Hydrated silica, of which IB and CTAB satisfy formula (I) and (II), preferably formula (I-1) and (II-1), has the effectively reduced number of type B micropores having ink bottle-shaped configurations with narrow openings, as well as a relatively large presence ratio of type A micropores having substantially cylindrical configurations, whereby rubber molecular chains can sufficiently enter micropores of the hydrated silica and be adsorbed therein to cause a satisfactory reinforcing effect, which successfully improves wear resistance of a tire without deteriorating rolling resistance properties thereof.

The aforementioned hydrated silica exhibits specific surface area by cetyltrimethylammonium bromide adsorption (CTAB) preferably in the range of 50 m²/g to 300 m²/g and more preferably in the range of 90 m²/g to 220 m²/g. CTAB less than 50 m²/g may significantly deteriorate wear resistance of a resulting tire. CTAB exceeding 300 m²/g does not allow the hydrated silica to be sufficiently dispersed in the rubber component, thereby possibly significantly deteriorating workability of a rubber composition and thus physical properties such as wear resistance of a resulting tire.

The hydrated silica of the present invention satisfies formulae (I) and (II) described above and, provided that "weight loss on ignition" (mass %) represents weight loss when the hydrate silicate is heated at 750° C. for 3 hours and "weight loss on heating" (mass %) represents weight loss when the hydrate silicate is heated at 105° C. for 2 hours, is to further satisfy the following formula (III)

$$(\text{"weight loss on ignition"} - \text{"weight loss on heating"}) \geq 2.5 \text{ (mass \%)} \quad (III)$$

and preferably further satisfy the following formula (III-1).

$$(\text{"weight loss on ignition"} - \text{"weight loss on heating"}) > 3.0 \text{ (mass \%)} \quad (III\text{-}1)$$

The aforementioned ("weight loss on ignition"−"weight loss on heating") represents a density index of silanol group present at surfaces of hydrated silica. Hydrated silica satisfying formula (III), as well as formulae (I) and (II), significantly contributes to achieving good balance between rolling resistance and wear resistance in a resulting tire through good interaction between the hydrated silica and rubber molecular chains.

Preferably 10 to 150 parts by mass, more preferably 30 to 100 parts by mass, of the hydrated silica may be blended with 100 parts by mass of the rubber component. Content of the hydrated silica less than 10 parts by mass (pbm) may adversely affect low-heat generation properties of the rubber composition. Content of the hydrated silica exceeding 150 pbm may deteriorate workability of rubber and wear resistance of a tire obtained from the rubber.

(Robber Component)

The rubber component included in the rubber composition for a tire of the present invention contains a modified polymer reactive to the hydrated silica.

In the present invention, the expression of "being reactive to the hydrated silica" represents that a substance has a characteristic of being chemically reacted with the hydrated silica in a reasonably vigorous manner or more specifically a characteristic of chemically adsorbed or bound to a functional group at a surface of the hydrated silica in a reasonably vigorous manner.

It is preferable to use as the modified polymer a modified conjugated diene-based polymer obtainable by: preparing a conjugated diene-based polymer having a metal-binding active site by anionic polymerization of a diene-based monomer and optionally other monomers in a hydrocarbon solvent using an alkali metal initiator or an alkali earth metal initiator; and reacting the metal-binding active site of the conjugated diene-based polymer with a hydrocarbyloxy silane compound.

It is preferable in the present invention to use as the modified polymer a modified conjugated diene-based polymer obtainable by: preparing a conjugated diene-based polymer having a metal-binding active site by anionic polymerization of a diene-based monomer and optionally other monomers in a hydrocarbon solvent using an alkali metal initiator or an alkali earth metal initiator; and reacting the metal-binding active site of the conjugated diene-based polymer with a hydrocarbyloxy silane compound. Examples of the hydrocarbyloxy silane compound optionally having a functional group for use include, without any particular restriction thereto, compounds each provided with a functional group having satisfactory affinity with silica, e.g. hydrocarbyloxy silane compounds represented by general formulae (XXI), (XXVIII), (XXVI) and (XXII) and/or condensates thereof.

$$R_a^a\text{—Si—}(OR^b)_{4-a} \quad (XXI)$$

In general formula (XXI), $R^a$ and $R^b$ each independently represent a $C_{1-20}$ monovalent aliphatic hydrocarbon group or a $C_{6-18}$ monovalent aromatic hydrocarbon group; "a" represents an integer in the range of 0 to 2; when a plurality of $OR^b$s exist, the plurality of $OR^b$s may be of either the same type or different types; and the molecule does not include active proton therein.

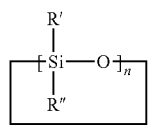
(XXVIII)

In general formula (XXVIII), "n" represents an integer in the range of 2 to 5 (preferably 3 to 4); and R' and R" each independently represent a $C_{1-20}$ monovalent aliphatic hydrocarbon group or a $C_{6-18}$ monovalent aromatic hydrocarbon group.

$$A^1\text{-}[\text{—SiR}^7R^8O\text{—}]_x\text{—SiR}^9R^{10}R^{11} \quad (XXVI)$$

In general formula (XXVI), $R^7$ and $R^8$ each represent a single bond or a $C_{1-20}$ divalent hydrocarbon group; $R^9$, $R^{10}$ and $R^{11}$ each independently represent a hydrogen atom or a $C_{1-20}$ monovalent hydrocarbon group; $A^1$ represents a hydrocarbyloxy silane compound group; and "x" represents an integer in the range of 1 to 10.

(XXII)
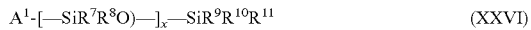

In general formula (XXII), $A^1$ represents a monovalent group having at least one type of functional group selected from epoxy, isocyanate, imine, cyano, carboxylic acid ester, carboxylic acid anhydride, cyclic tertiary amine, non-cyclic tertiary amine, pyridine, silazane, and sulfide; $R^c$ represents a single bond or a divalent hydrocarbon group, $R^d$ represents a $C_{1-20}$ monovalent aliphatic hydrocarbon group, a $C_{6-18}$ monovalent aromatic hydrocarbon group or a reactive group; $R^e$ represents a $C_{1-20}$ monovalent aliphatic hydrocarbon group or a $C_{6-18}$ monovalent aromatic hydrocarbon group; "b" represents an integer in the range of 0 to 2; when a plurality of $R^d$s and $OR^e$s exist, the plurality of $R^d$s and $OR^e$s may be of either the same type or different types, respectively; and the molecule does not include active proton therein.

In the present invention, a "partial condensate" represents a condensate having a Si—O—Si bond resulted from condensation of a part of (i.e. not the entire portion of) a SiOR group of a hydrocarbyloxy silane compound.

The (conjugated diene-based) polymer for use in the aforementioned modification reaction preferably exhibits livingness in at least 20% of polymer chains thereof.

Specific examples of the hydrocarbyloxy silane compound represented by general formula (XXI) used to be reacted with an active site of the polymer include tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, ethyltripropoxysilane, ethyltriisopropoxysilane, propyltrimethoxysilane, propyltriethoxysilane, propyltripropoxysilane, propyltriisopropoxysilane, butyltrimethoxysilane, butyltriethoxysilane, phenyltrimethoxysilane, phenyltriethoxysilane, dimethyldimethoxysilane, methylphenyldimethoxysilane, dimethyldiethoxysilane, vinyltrimethoxysilane, vinyltriethoxysilane, divinyldiethoxysilane, and the like. Tetraethoxysilane, methyltriethoxysilane and dimethyldiethoxysilane are preferable among these examples. These examples may be used either by selecting single type solely or in combination of two or more types.

Specific examples of the hydrocarbyloxy silane compound represented by general formula (XXVIII) used to be reacted with an active site of the polymer include hexamethyltrisiloxane and octamethyltetrasiloxane.

Specific preferable examples of the hydrocarbyloxy silane compound represented by general formula (XXII) used to be reacted with an active site of the polymer include, as epoxy group-containing hydrocarbyloxy silane compounds, 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane. 3-glycidoxypropyltrimethoxysilane and 2-(3,4-epoxycyclohexyl)ethyltrimethoxysilane are particularly preferable among these examples.

Specific examples of the hydrocarbyloxy silane compound represented by general formula (XXII) used to be reacted with an active site of the polymer include, as isocyanate group-containing hydrocarbyloxy silane compounds, 3-isocyanatepropyltrimethoxysilane, 3-isocyanatepropyltriethoxysilane, 3-isocyanatepropylmethyldiethoxysilane, 3-isocyanatepropyltriisopropoxysilane, and the like. 3-isocyanatepropyltrimethoxysilane is particularly preferable among these examples.

Specific preferable examples of the hydrocarbyloxy silane compound represented by general formula (XXII) used to be reacted with an active site of the polymer include, as imine group-containing hydrocarbyloxy silane compounds, N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimethylaminobenzylidene)-3-(triethoxysilyl)-1-propaneamine, N-(cyclohexylidene)-3-(triethoxysilyl)-1-propaneamine; trimethoxysilyl compounds, methyldiethoxysilyl compounds, ethyldimethoxysilyl compounds corresponding to these triethoxysilyl compounds, and the like. N-(1,3-dimethylbutylidene)-3-(triethoxysilyl)-1-propaneamine and N-(1-methylpropylidene)-3-(triethoxysilyl)-1-propaneamine are particularly preferable among these examples.

Specific preferable examples of the hydrocarbyloxy silane compound represented by general formula (XXII) used to be reacted with an active site of the polymer include, as imine(amidine) group-containing hydrocarbyloxy silane compounds, 1-[3-(trimethoxysilyl)propyl]-4,5-dihydroimidazole, 3-(1-hexamethyleneimino)propyl(triethoxy)silane, (1-hexamethyleneimino)methyl(trimethoxy)silane, N-(3-triethoxysilylpropyl)-4,5-dihydroimidazole, N-(3-isopropoxysilylpropyl)-4,5-dihydroimidazole, N-(3-methyldiethoxysilylpropyl)-4,5-dihydroimidazole, and the like. N-(3-triethoxysilylpropyl)-4,5-dihydroimidazole and N-(3-isopropoxysilylpropyl)-4,5-dihydroimidazole are particularly preferable among these examples.

Specific examples of the hydrocarbyloxy silane compound represented by general formula (XXII) used to be reacted with an active site of the polymer include, as carboxylic acid ester group-containing hydrocarbyloxy silane compounds, 3-methacryloyloxypropyltriethoxysilane, 3-methacryloyloxypropyltrimethoxysilane, 3-methacryloyloxypropylmethyldiethoxysilane, 3-methacryloyloxypropyltriisopropoxysilane, and the like. 3-methacryloyloxypropyltriethoxysilane is preferable among these examples.

Specific examples of the hydrocarbyloxy silane compound represented by general formula (XXII) used to be reacted with an active site of the polymer include, as carboxylic acid anhydride group-containing hydrocarbyloxy silane compounds, 3-(trimethoxysilyl)propyl succinic anhydride, 3-(triethoxysilyl)propyl succinic anhydride, 3-(methyldiethoxysilyl)propyl succinic anhydride, and the like. 3-(triethoxysilyl)propyl succinic anhydride is preferable among these examples.

Specific examples of the hydrocarbyloxy silane compound represented by general formula (XXII) used to be reacted with an active site of the polymer include, as cyano group-containing hydrocarbyloxy silane compounds, 2-cyanoethylpropyltriethoxysilane, and the like.

Specific examples of the hydrocarbyloxy silane compound represented by general formula (XXII) used to be reacted with an active site of the polymer include, as cyclic tertiay amine group-containing hydrocarbyloxy silane compounds, 3-(1-hexamethyleneimino)propyltriethoxysilane, 3-(1-hexamethyleneimino)propyltrimethoxysilane, (1-hexamethyleneimino)methyltriethoxysilane, (1-hexamethyleneimino)methyltrimethoxysilane, 2-(1-hexamethyleneimino)ethyltriethoxysilane, 3-(1-hexamethyleneimino)ethyltrimethoxysilane, 3-(1-pyrrolidinyl)propyltrimethoxysilane, 3-(1-pyrrolidinyl)propyltriethoxysilane, 3-(1-heptamethyleneimino)propyltriethoxysilane, 3-(1-dodecamethyleneimino) propyltriethoxysilane, 3-(1-hexamethyleneimino) propyltriethoxymethylsilane, 3-(1-hexamethyleneimino) propyldiethoxyethylsilane, 3-[10-(triethoxysilyl)decyl]-4-oxazoline, and the like. 3-(1-hexamethyleneimino)propyltriethoxysilane and (1-hexamethyleneimino)methyltriethoxysilane are preferable among these examples.

Specific examples of the hydrocarbyloxy silane compound represented by general formula (XXII) used to be reacted with an active site of the polymer include, as non-cyclic tertiay amine group-containing hydrocarbyloxy silane compounds, 3-dimethylaminopropyltriethoxysilane, 3-dimethylaminopropyltrimethoxysilane, 3-diethylaminopropyltriethoxysilane, 3-diethylaminopropyltrimethoxysilane, 2-dimethylaminoethyltriethoxysilane, 2-dimethylaminoethyltrimethoxysilane, 3-dimethylaminopropyldiethoxymethylsilane, 3-dibutylaminopropyltriethoxysilane, and the like. 3-dimethylaminopropyltriethoxysilane and 3-diethylaminopropyltriethoxysilane are preferable among these examples.

Specific examples of the hydrocarbyloxy silane compound represented by general formula (XXII) used to be reacted with an active site of the polymer include, as pyridine-containing hydrocarbyloxy silane compounds, 2-trimethoxysilylethylpyridine.

Specific examples of the hydrocarbyloxy silane compound represented by general formula (XXII) used to be reacted with an active site of the polymer include, as silazane-containing hydrocarbyloxy silane compounds, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, N,N-bis(trimethylsilyl)aminoethylmethyldiethoxysilane, and the like. N,N-bis(trimethylsilyl)aminopropyltriethoxysilane, N,N-bis(trimethylsilyl)aminopropylmethyldiethoxysilane, and 1-trimethylsilyl-2,2-dimethoxy-1-aza-2-silacyclopentane are preferable among these examples.

Specific examples of the hydrocarbyloxy silane compound represented by general formula (XXII) used to be reacted with an active site of the polymer include, as sulfide-containing hydrocarbyloxy silane compounds, bis(3-triethoxysilylpropyl)tetrasulfide, bis(3-triethoxysilylpropyl)disulfide, and the like.

It is particularly preferable to use, as the hydrocarbyloxy silane compound optionally having a functional group, a compound including within a molecule thereof a protected primary amino group and a difunctional silicon atom having a hydrocarbyloxy group and a reactive group bound thereto, e.g. at least one type of compound selected from those represented by general formula (XXIII), general formula (XXIV), general formula (XXVII) and general formula (XXV) and/or a partial condensate thereof.

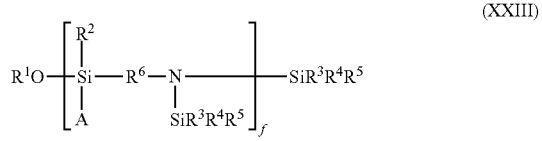

(XXIII)

In general formula (XXIII), $R^1$ and $R^2$ each independently represent a $C_{1-20}$ hydrocarbon group; $R^3$ to $R^5$ each independently represent a $C_{1-20}$ hydrocarbon group; $R^6$ represents a $C_{1-12}$ divalent hydrocarbon group; "A" represents a reactive group; and "f" represents an integer in the range of 1 to 10.

(XXIV)

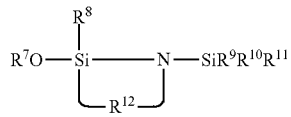

In general formula (XXIV), $R^7$ to $R^{11}$ each independently represent a $C_{1-20}$ hydrocarbon group; and $R^{12}$ represents a $C_{1-12}$ divalent hydrocarbon group.

(XXVII)

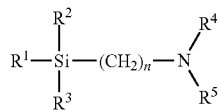

In general formula (XXVII), $R^1$, $R^2$ and $R^3$ may be of either the same type or different types, each include at least one hydrocarbyloxy silane group, and each represent a branched/non-branched alkyl group, a branched/non-branched alkoxy group, a branched/non-branched silyloxy group, a branched/non-branched acetal group, carboxyl group, mercapto group or a derivative thereof; $R^4$ and $R^5$ may be of either the same type or different types and each represent a hydrogen atom or a branched/non-branched alkyl group; and "n" represents an integer.

(XXV)

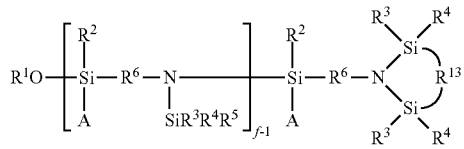

In general formula (XXV), $R^1$ and $R^2$ each independently represent a $C_{1-20}$ hydrocarbon group; $R^3$ to $R^5$ each independently represent a $C_{1-20}$ hydrocarbon group; $R^6$ represents a $C_{1-12}$ divalent hydrocarbon group; $R^{13}$ represents a $C_{1-12}$ divalent hydrocarbon group; "A" represents a reactive group; and "f" represents an integer in the range of 1 to 10.

Specific examples of the monovalent $C_{1-20}$ hydrocarbon groups in general formulae (XXIII) to (XXV) described above include, in each of the hydrocarbon groups independently, methyl, ethyl, n-propyl, isopropyl, n-butyl, isobutyl, sec-butyl, tert-butyl, pentyl of various types, hexyl of various types, octyl of various types, decyl of various types, dodecyl of various types, tetradecyl of various types, hexadecyl of various types, octadecyl of various types, icosyl of various types, cyclopentyl, cyclohexyl, vinyl, propenyl, allyl, hexenyl, octenyl, cyclopentenyl, cyclohexenyl, phenyl, tolyl, xylyl, naphthyl, benzyl, phenethyl, naphthylmethyl, and the like. $C_{1-4}$ methyl, ethyl, n-propyl, isopropyl, n-butyl, isobutyl, sec-butyl, tert-butyl groups and the like are preferable and $C_{1-4}$ ethyl, methyl, and tert-butyl groups are particularly preferable among these examples.

Examples of a $C_{1-12}$ divalent hydrocarbon group include a $C_{1-12}$ alkylene group, a $C_{6-12}$ arylene group, a $C_{7-12}$ arylenealkylene group, and the like.

The $C_{1-12}$ alkylene group may be either normal or branched and specific examples thereof include: a normal alkylene group such as methylene, ethylene, trimethylene, tetramethylene, hexamethylene, octamethylene, decamethylene group; and a branched alkylene group such as propylene, isopropylene, isobutylene, 2-methyltrimethylene, isopentylene, isohexylene, isooctylene, 2-ethylhexylene, isodecylene group, and the like.

Examples of the $C_{6-12}$ arylene group include phenylene, methylphenylene, dimethylphenylene, naphthylene group, and the like. Examples of the $C_{7-12}$ arylenealkylene group include phenylenemethylene, phenyleneethylene, xylylene group, and the like.

A $C_{1-4}$ alkylene group is preferable and trimethylene group is particularly preferable among the aforementioned examples of the $C_{1-12}$ divalent hydrocarbon group.

The reactive group as "A" described above is preferably a halogen atom or a $C_{1-20}$ hydrocarbyloxy group and examples of the halogen atom include fluorine, chlorine, bromine and iodine. Chlorine is preferable among these examples of the halogen atom.

Examples of the $C_{1-20}$ hydrocarbyloxy group include a $C_{1-20}$ alkoxy group, a $C_{6-20}$ aryloxy group, a $C_{7-20}$ aralkyloxy group, and the like.

Examples of the $C_{1-20}$ alkoxy group include methoxy, ethoxy, n-propoxy, n-butoxy, isobutoxy, sec-butoxy, tert-butoxy, hexoxy of various types, octoxy of various types, decyloxy of various types, dodecyloxy of various types, tetradecyloxy of various types, hexadecyloxy of various types, octadecyloxy of various types, icosyloxy of various types, and the like. Examples of the $C_{6-20}$ aryloxy group include phenoxy, methylphenoxy, dimethylphenoxy, naphthoxy groups, and the like. Examples of the $C_{7-20}$ arylkyloxy group include benzyloxy, phenethyloxy, naphthylmethoxy groups, and the like. A $C_{1-4}$ alkoxy group is preferable and ethoxy group is particularly preferable among the aforementioned examples of the $C_{1-20}$ hydrocarbyloxy group.

Other examples of the reactive group "A" include a group having carbonyl group, a residual group of acid anhydride, any of respective dihydroimidazolynyl groups, N-methylpyrrolidonyl group, isocyanate group or the like.

Two of $R^3$, $R^4$ and $R^5$ of general formula (XXIII) may be combined to form, together with the silicon atom to which these two groups are bound, a 4-7 membered ring. Similarly, two of $R^9$, $R^{10}$ and $R^{11}$ of general formula (XXIV) may be combined to form, together with the silicon atom to which these two groups are bound, a 4-7 membered ring. Examples of such a 4-7 membered ring include a $C_{4-7}$ ring having a methylene group.

Examples of the compound including (within a molecule thereof) a protected primary amino group and a difunctional silicon atom having a hydrocarbyloxy group bound thereto include N,N-bis(trimethylsilyl)aminopropylmethyldimethoxysilane, N,N-bis(trimethylsilyl)aminopropylmethyldiethoxysilane, N,N-bis(trimethylsilyl)aminoethylmethyldimethoxysilane, N,N-bis(trimethylsilyl)aminoethylmethyldiethoxysilane, 1-trimethylsilyl-2-ethoxy-2-methyl-1-aza-2-silacyclopentane, and the like.

Further, in general formulae (XXIII), (XXIV), (XXVII) and (XXV), examples of the compound having a halogen atom as "A" include N,N-bis(trimethylsilyl)aminopropylmethoxychlorosilane, N,N-bis(trimethylsilyl)aminopropylmethylethoxychlorosilane, N,N-bis(trimethylsilyl)aminoethylmethylmethoxychlorosilane, N,N-bis (trimethylsilyl)aminoethylmethylethoxychlorosilane, and the like. N,N-bis(trimethylsilyl)aminopropylmethyldimethoxysilane, N,N-bis(trimethylsilyl)aminopropylmethyldiethoxysilane, and 1-trimethylsilyl-2-ethoxy-2-methyl-1-aza-2-silacyclopentane are preferable among these examples.

The aforementioned hydrocarbyloxy silane compounds as a modifying agent can be used either by selecting single type solely or in combination of two or more types. The modifying agent may be a partial condensate. A "partial condensate" represents a condensate having a Si—O—Si bond resulted from condensation of a part of (i.e. not the entire portion of) a SiOR group of the modifying agent in the present invention.

The (conjugated diene-based) polymer for use in the aforementioned modification reaction preferably exhibits livingness in at least 10% of polymer chains thereof.

The resulting modified polymer is preferably a modified conjugated diene polymer having at a terminal end of a molecule thereof a silanol group and a functional group facilitating a reaction between the silanol group and the hydrated silica. A hydroxyl group at a surface of the hydrated silica, the silanol group of the modified polymer, and an atom (O, S or N atom) having an unpaired electron in the functional group facilitating a reaction between the silanol group and the reinforcing filler (the hydrated silica) of the modified polymer presumably form a stable structure therebetween because the functional group facilitating a reaction between the silanol group and hydrated silica exists in the vicinity of the silanol group, thereby successfully improving reactivity of the silanol group with respect to the hydrated silica.

In the present invention, a state that "the functional group exists in the vicinity of the silanol group" requires the functional group to be located within the range, expressed as the number of carbon atoms, of: preferably 1 to 20 counted from the silanol group (a silicon atom may exist between the two groups); more preferably 1 to 15 counted from the silanol group (a silicon atom may exist between the two groups); further more preferably 1 to 12 counted from the silanol group (a silicon atom may exist between the two groups); yet further more preferably 1 to 10 counted from the silanol group (a silicon atom may exist between the two groups); and yet further more preferably 1 to 5 counted from the silanol group (a silicon atom may exist between the two groups).

More specifically, the modified conjugated diene polymer is preferably represented by general formula (XI) or (XII) shown below. "(Polymer)-" in general formulae (XI) and (XII) represents a polymer chain of the modified conjugated diene polymer.

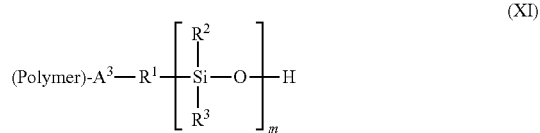
(XI)

In general formula (XI), $R^1$ is a single bond or a $C_{1-20}$ divalent hydrocarbon group; $R^2$ and $R^3$ each independently represent a hydrogen atom or a $C_{1-20}$ monovalent hydrocarbon group; $A^3$ represents a functional group facilitating a reaction between the silanol group and the hydrated silica; "m" represents an integer in the range of 1 to 10.

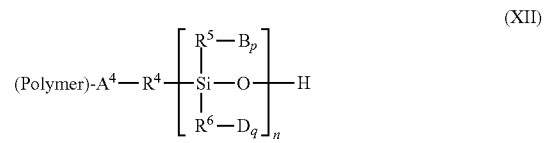
(XII)

In general formula (XII), $R^4$ is a single bond or a $C_{1-20}$ hydrocarbon group; $R^5$ and $R^6$ each independently represent a single bond, a hydrogen atom or a $C_{1-20}$ hydrocarbon group; $A^4$ represents a single bond, a $C_{1-20}$ hydrocarbon group or a functional group facilitating a reaction between the silanol group and the hydrated silica; B and D each independently represent a group including at least one functional group facilitating a reaction between the silanol group and the hydrated silica; p and q each independently represent an integer in the range of 0 to 5, provided that $(p+q) \geq 1$; and "n" is an integer in the range of 1 to 10.

Specific examples of the $C_{1-20}$ divalent hydrocarbon group, as $R^1$, $R^4$, $R^5$ when p=1, and $R^6$ when q=1, in general formula (XI) and general formula (XII) include methylene, ethylene, propane-1,3-diyl, butane-1,3-diyl, butane-1,4-diyl, pentane-1,3-diyl, pentane-1,5-diyl, hexane-1,3-diyl, hexane-1,6-diyl, heptane-1,3-diyl, heptane-1,7-diyl, octane-1,8-diyl, nonane-1,9-diyl, decane-1,10-diyl, cyclopentane-1,3-diyl, cyclohexane-1,4-diyl groups, and the like. Propane-1,3-diyl group is particularly preferable among these examples.

$R^5$ when p=0 and $R^6$ when q=0 each represent a hydrogen atom or a $C_{1-20}$ monovalent hydrocarbon group like $R^2$ and $R^3$ in each of general formula (XI) and general formula (XII). That is, the number of valence bond of $R^5$ is (p+1) and the number of valence bond of $R^6$ is (q+1).

Specific examples of the $C_{1-20}$ monovalent hydrocarbon group, as $R^2$, $R^3$, $R^5$ when p=0, and $R^6$ when q=0, in general formula (XI) and general formula (XII) include methyl, ethyl, propyl, isopropyl, n-butyl, sec-butyl, tert-butyl, n-pentyl, n-hexyl, n-heptyl, n-octyl, stearyl groups, and the like. Methyl group and ethyl group are preferable among these examples.

In general formula (XI) and general formula (XII), it is preferable that the functional groups $A^3$ and $A^4$ each facilitating a reaction between the silanol group and the hydrated silica each independently represent at least one type of divalent functional group selected from the group consisting of: a divalent functional group having at least one type of bond selected from ether bond, thioether bond, urethane bond, thiourethane bond, imino bond and amido bond; and a divalent functional group derived from a functional group selected from nitrile, pyridyl, N-alkylpyrrolidonyl, N-alkylimidazolyl, N-alkylpyrazolyl, ketone, thioketone, aldehyde, thioaldehyde, a residual group of isocyanuric acid triester, a residual group of $C_{1-20}$ carboxylic acid hydrocarbyl ester or $C_{1-20}$ thiocarboxylic acid hydrocarbyl ester, a residual group of $C_{1-20}$ carboxylic acid metal salt or $C_{1-20}$ thiocarboxylic acid metal salt, a residual group of $C_{1-20}$ carboxylic acid anhydride, a residual group of $C_{1-20}$ carboxylic acid halide, and a residual group of $C_{1-20}$ carbonic acid dihydrocarbyl ester.

The divalent functional group having at least one type of bond selected from ether bond, thioether bond, urethane bond, thiourethane bond, imino bond and amido bond may be either (i) ether bond, thioether bond, urethane bond, thiourethane bond, imino bond and amido bond themselves or (ii) a $C_{1-20}$ divalent hydrocarbon group having any of ether bond, thioether bond, urethane bond, thiourethane bond, imino bond and amido bond. Examples of the $C_{1-20}$ divalent hydrocarbon group include methylene, ethylene, propane-1,3-diyl, butane-1,3-diyl, butane-1,4-diyl, pentane-1,3-diyl, pentane-1,5-diyl, hexane-1,3-diyl, hexane-1,6-diyl, heptane-1,3-diyl, heptane-1,7-diyl, octane-1,8-diyl, nonane-1,9-diyl, decane-1,10-diyl, cyclopentane-1,3-diyl, cyclohexane-1,4-diyl groups, and the like. Propane-1,3-diyl group is particularly preferable among these examples.

$R^5$ when p=0 and $R^6$ when q=0 each represent, as is the case with $R^2$ and $R^3$, a hydrogen atom or a $C_{1-20}$ monovalent hydrocarbon group. That is, the number of valence bond of $R^5$ is (p+1) and the number of valence bond of $R^6$ is (q+1).

In general formula (XII), B and D, each including at least one functional group facilitating a reaction between the silanol group and the hydrated silica, each independently represent at least one type of functional group selected from the group consisting of primary amino group, secondary amino group, protected primary/secondary amino group, tertiary amino group, cyclic amino group, oxazolyl group, imidazolyl group, aziridinyl group, ketone group, thioketone group, aldehyde group, thioaldehyde group, thioamido group, epoxy group, thioepoxy group, iscyanate group, thioisocyanate group, nitrile group, pyridyl group, N-alkylpyrrolidonyl group, N-alkylimidazolyl group, N-alkylpyrazolyl group, imino group, amido group, ketimine group, a residual group of imine, a residual group of isocyanuric acid triester, a residual group of $C_{1-20}$ carboxylic acid hydrocarbyl ester or $C_{1-20}$ thiocarboxylic acid hydrocarbyl ester, a residual group of $C_{1-20}$ carboxylic acid metal salt or $C_{1-20}$ thiocarboxylic acid metal salt, a residual group of $C_{1-20}$ carboxylic acid anhydride, a residual group of $C_{1-20}$ carboxylic acid halide, a residual group of $C_{1-20}$ carbonic acid dihydrocarbyl ester, and a functional group represented by general formula: -E-F-G, wherein E represents imino group, divalent residual group of imine, divalent residual group of pyridine or divalent residual group of amido, F represents $C_{1-20}$ alkylene group, phenylene group or $C_{8-20}$ aralkylene group, and G represents primary amino group, secondary amino group, protected primary/secondary amino group, tertiary amino group, cyclic amino group, oxazolyl group, imidazolyl group, aziridinyl group, ketimine group, nitrile group, amido group, pyridine group, isocyanate group or thioisocyanate group.

The modified conjugated diene polymer of the present invention preferably has only one silanol group in a molecular chain thereof, as shown in general formula (XI) or general formula (XII). Presence of two or more silanol groups in a molecular chain of the modified conjugated diene polymer may result in condensation between the silanol groups, which would possibly increase viscosity of the modified conjugated diene polymer to make kneading and mixing operation thereof difficult.

The modified conjugated diene polymer of the present invention, having both a silanol group and a functional group located in the vicinity of the silanol group to facilitate a reaction between the silanol group and the hydrated silica as the reinforcing filler, significantly improves low-heat generation properties in each of a silica-blended rubber composition and a carbon black-blended rubber composition, as compared with a modified conjugated diene polymer having only a silanol and lacking any functional group for facilitating a reaction between the silanol group and the hydrated silica and a modified conjugated diene polymer having only a functional group for facilitating a reaction between a silanol group and the hydrated silica and lacking any silanol group.

Content of vinyl bond in a conjugated diene portion of the modified conjugated diene polymer is not particularly restricted but preferably 70% or lower. The content of vinyl bond in a conjugated diene portion of the modified conjugated diene polymer≤70% is preferable because then fracture properties and wear resistance improve when the modified conjugated diene polymer is applied to a tire tread. Further, content of styrene in the modified conjugated diene polymer is preferably in the range of 0 to 50 mass %. The content of styrene in the modified conjugated diene polymer≤50 mass % improves the balance between low heat generation properties and wet skid performance of a tire. Content of vinyl bond is to be determined by infrared spectroscopy (Morello) and content of styrene is to be determined by calculating an integration ratio of spectrum thereof by $^1$H-NMR in the present invention.

Examples of a conjugated diene polymer constituting the modified conjugated diene polymer include polybutadiene, polyisoprene, butadiene-isoprene copolymer, styrene-butadiene copolymer, styrene-isoprene copolymer, styrene-isoprene-butadiene terpolymer, and the like.

Regarding a method for producing the modified conjugated diene polymer, the method is not particularly restricted as long as a modified conjugated diene polymer reactive to the hydrated silica can be obtained by the method. Examples of the method include the one described below.

A method for producing a modified conjugated diene polymer, including the steps of:

preparing a conjugated diene polymer having an active site;

preparing an organic silane compound having a specific functional group capable of generating a silanol group by hydrolysis, as well as (i) a functional group located in the vicinity of the specific functional group and capable of coupling the organic silane compound with the conjugated diene polymer through addition reaction or substitution reaction at the active site of the conjugated diene polymer and facilitating, after the coupling reaction, a reaction between the silanol group and the hydrated silica as a reinforcing filler or (ii) a functional group located in the vicinity of the specific functional group and facilitating a reaction between the silanol group and the reinforcing filler;

reacting the active site of the conjugated diene polymer with the organic silane compound (a modification reaction process);

subjecting the conjugated diene polymer thus modified to hydrolysis (a hydrolysis step after completion of the modification reaction process); and optionally further subjecting the modified conjugated diene polymer to a condensation reaction under the presence of a condensation accelerator to allow the modified conjugated diene polymer to be condensed (a condensation reaction step).

It is preferable that: the specific functional group capable of generating a silanol group by hydrolysis described above is an alkoxysilane group; and at least 10% of the specific functional groups can generate silanol groups by hydrolysis, to achieve a good effect of the present invention.

The specific functional group for generating a silanol group by hydrolysis, which specific functional group must first become a silanol group when it is reacted with a reinforcing filler (silica, in particular), can exhibit improved reactivity with silica by becoming or generating a silanol group by hydrolysis in advance, i.e. prior to the reaction with the silica, so that such improved reactivity causes a superior effect of improving dispersibility of silica in a rubber composition and low heat generation properties of the rubber composition. Further, the specific functional group for generating silanol group by hydrolysis of the present invention does not generate a volatile organic compound (VOC, alcohol in particular), which is preferable in terms of a work environment (in contrast, if an alkoxy group were to be used as the specific functional group, it would generate a VOC).

The organic silane compound having a specific functional group capable of generating a silanol group by hydrolysis, as well as (i) a functional group located in the vicinity of the specific functional group and capable of coupling the organic silane compound with the conjugated diene polymer through addition reaction or substitution reaction at the active site of the conjugated diene polymer and facilitating, after the coupling reaction, a reaction between the silanol group and the hydrated silica as a reinforcing filler or (ii) a functional group located in the vicinity of the specific functional group and facilitating a reaction between the silanol group and the reinforcing filler, is preferably an organic silane compound represented by general formula (XII) or general formula (XIV) shown below.

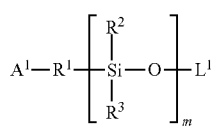

(XIII)

In general formula (XIII), $R^1$ represents a single bond or a $C_{1-20}$ divalent hydrocarbon group; $R^2$ and $R^3$ each independently represent a hydrogen atom or a $C_{1-20}$ monovalent hydrocarbon group; $—OL^1$ represents a hydrolyzable functional group capable of generating, together with Si, a silanol group through hydrolysis thereof; $A^1$ represents a functional group capable of coupling the organic silane compound with the conjugated diene polymer through addition reaction or substitution reaction at the active site of the conjugated diene polymer and facilitating, after the coupling reaction, a reaction between the silanol group and the hydrated silica as a reinforcing filler, and m is an integer in the range of 1 to 10. When "$R^1$ represents a single bond", $A^1$ and Si may be directly bonded to each other by a single bond in general formula (XIII). The same principle is applied to $R^4$, $R^5$, $R^6$ and $A^4$.

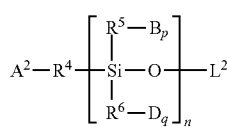

(XIV)

In general formula (XIV), $R^4$ is a single bond or a $C_{1-20}$ hydrocarbon group; $R^5$ and $R^6$ each independently represent a single bond, a hydrogen atom or a $C_{1-20}$ hydrocarbon group; $—OL^2$ represents a hydrolyzable functional group capable of generating, together with Si, a silanol group through hydrolysis thereof; $A^2$ represents a functional group reactive to the active site or a functional group capable of coupling the organic silane compound with the conjugated diene polymer through addition reaction or substitution reaction at the active site of the conjugated diene polymer; B and D each independently represent a group including at least one functional group facilitating a reaction between the silanol group and the hydrated silica as a reinforcing filler, p and q each independently represent an integer in the range of 0 to 5, provided that (p+q)≥1; and n is an integer in the range of 1 to 10.

Preferable examples of the hydrolyzable functional group capable of generating, together with Si, a silanol group through hydrolysis thereof include $C_{1-20}$ alkoxy group, phenoxy group, benzyloxy group, $—OM_{(1/x)}$, and the like. $C_{1-20}$ alkoxy group is particularly preferable and $C_{1-12}$ alkoxy group is the most preferable among these examples.

Specific examples of the $C_{1-20}$ alkoxy group include methoxy, ethoxy, propoxy, isopropoxy, n-butoxy, tert-butoxy groups, and the like. In the formula $—OM_{(1/x)}$ described above, "M" represents a metal atom selected from: group 1 elements (i.e. alkali metals) other than hydrogen; group 2 to 12 elements; group 13 elements other than boron; group 14 elements other than carbon and silicon; and group 15 elements other than nitrogen, phosphate and arsenic. "x" represents the valence number of the metal atom. The group 2 elements are constituted of Be, Mg and alkali earth metals. Alkali metals, Mg, alkali earth metals, Sn, Al, Ti, and Fe are preferable and Li, Na, K, Mg, Ca, Ba, Sn, Al, Ti and Fe are particularly preferable among these examples of the metal atom.

Examples of $A^1$ in general formula (XIII), representing a functional group capable of coupling the organic silane compound with the conjugated diene polymer through addition reaction or substitution reaction at the active site of the conjugated diene polymer and facilitating, after the coupling reaction, a reaction between the silanol group and the hydrated silica as a reinforcing filler, include epoxy group (including glycidoxy group), thioepoxy group, isocyanate group, thioisocayanate group, nitrile group (cyano group), pyridyl group, N-alkylpyrrolidonyl group, N-alkylimidazolyl group, N-alkylpyrazolyl group, ketone group, thioketone group, aldehyde group, thioaldehyde group, a residual group of imine, amido group, ketimine group, a residual group of isocyanuric acid triester, a residual group of $C_{1-20}$ carboxylic acid hydrocarbyl ester or $C_{1-20}$ thiocarboxylic acid hydrocarbyl ester, a residual group of $C_{1-20}$ carboxylic acid metal salt or $C_{1-20}$ thiocarboxylic acid metal salt, a residual group of $C_{1-20}$ carboxylic acid anhydride, a residual group of $C_{1-20}$ carboxylic acid halide, and a residual group of $C_{1-20}$ carbonic acid dihydrocarbyl ester. Preferable examples of halogen of the residual group of $C_{1-20}$ carboxylic acid halide include chloride, bromine and fluorine. Preferable examples of the residual group of $C_{1-20}$ carboxylic acid anhydride include a residual group of maleic anhydride, a residual group of phthalic anhydride, a residual group of acetic anhydride, and the like. These groups couple the organic silane compound with the active site of the conjugated diene polymer and then facilitate a reaction between the silanol group and silica.

Examples of $A^2$ in general formula (XIV), representing a functional group reactive to the active site of the conjugated diene polymer or a functional group capable of coupling the organic silane compound with the conjugated diene polymer through addition reaction or substitution reaction at the active site of the conjugated diene polymer, include: a functional group represented by formula (XIV-a) below

(XIV-a)

[in formula (XIV-a), $R^d$ represents a single bond, a $C_{1-10}$ substituted or unsubstituted alkylene group, or $—OR^e$ ($R^e$ represents $C_{1-10}$ substituted or unsubstituted alkylene), X represents a halogen atom or a $C_{1-10}$ alkoxy group, wherein a plurality Xs may be of either the same type or different types]; epoxy group; thioepoxy group: iscyanate group; thioisocyanate group; nitrile group; imidazolyl group; ketimine group; ketone group; thioketone group; protected primary/secondary amine group; and the like.

Further, the "functional group $A^2$" of the organic silane compound "to be reacted with the active site of the conjugated diene polymer" in the method for producing the modified conjugated diene polymer represents a functional group $A^2$ capable of chemically being reacted with the active site of the modified conjugated diene polymer and preferable examples thereof include $C_{1-20}$ alkoxy, phenoxy, benzyloxy, halogen groups, and the like. $C_{1-20}$ alkoxy group is particularly preferable and $C_{1-12}$ alkoxy group is the most preferable among these examples. Specific examples of $C_{1-20}$ alkoxy group include methoxy, ethoxy, propyloxy, isopropyloxy, n-butoxy, tert-butoxy groups, and the like. Preferable examples of halogen as "X" include chloride, bromine and fluorine.

B and D, each including at least one functional group facilitating a reaction between the silanol group and the hydrated silica as a reinforcing filler, in general formula (XIV) each independently represent primary amino group, secondary amino group, protected primary/secondary amino group, tertiary amino group, cyclic amino group, oxazolyl group, imidazolyl group, aziridinyl group, ketone group, thioketone group, aldehyde group, thioaldehyde group, thioamido group, epoxy group (including glycidoxy group), thioepoxy group, iscyanate group, thioisocyanate group, nitrile group (cyano group), pyridyl group, N-alkylpyrrolidonyl group, N-alkylimidazolyl group, N-alkylpyrazolyl group, imino group, amido group, ketimine group, a residual group of imine, a residual group of isocyanuric acid triester, a residual group of $C_{1-20}$ carboxylic acid hydrocarbyl ester or $C_{1-20}$ thiocarboxylic acid hydrocarbyl ester, a residual group of $C_{1-20}$ carboxylic acid metal salt or $C_{1-20}$ thiocarboxylic acid metal salt, a residual group of $C_{1-20}$ carboxylic acid anhydride, a residual group of $C_{1-20}$ carboxylic acid halide, and a residual group of $C_{1-20}$ carbonic acid dihydrocarbyl ester, and a functional group represented by general formula: -E-F-G, wherein E represents imino group, divalent residual group of imine, divalent residual group of pyridine or divalent residual group of amido, F represents $C_{1-20}$ alkylene group, phenylene group or $C_{8-20}$ aralkylene group, and G represents primary amino group, secondary amino group, protected primary/secondary amino group, tertiary amino group, cyclic amino group, oxazolyl group, imidazolyl group, aziridinyl group, ketimine group, nitrile group (cyano group), amido group, pyridine group, isocyanate group or thioisocyanate group.

Specific examples of the functional group represented by -E-F-G include —NH—$C_2H_4$—$NH_2$, —NH—$C_2H_4$—N$(CH_3)_2$, and a functional group obtained by substituting —$C_2H_4$— thereof with —$C_6H_{12}$— or phenylene group. a functional group represented by formula (XIV-a) below In general formula (XIV), the silicon-containing group where a halogen atom or an alkoxy group is bonded to a silicon atom, as well as the —$R^dSiX_3$ group represented by formula (XIV-a), is a group to be bonded to the active site of the conjugated diene polymer; and epoxy group, thioepoxy group, iscyanate group, thioisocyanate group, nitrile group, imidazolyl group, ketimine group, ketone group, thioketone group or protected primary/secondary amino group are groups facilitating a reaction between the silanol group and the hydrated silica.

A hydroxyl group at a surface of the reinforcing filler (the hydrated silica in particular), the silanol group of the modified polymer, and an atom (O, S or N atom) having an unpaired electron in the functional group facilitating a reaction between the silanol group and the reinforcing filler (the hydrated silica) of the modified polymer presumably form a stable structure therebetween because the functional group facilitating a reaction between the silanol group and hydrated silica exists in the vicinity of the silanol group, thereby successfully improving reactivity of the silanol group with respect to the hydrated silica. As a result, low heat generation properties of the rubber composition for a tire of the present invention, using the modified conjugated diene polymer of the present invention, improve.

Specific examples of the $C_{1-20}$ divalent hydrocarbon group, as $R^1$, $R^4$, $R^5$ when p=1, and $R^6$ when q=1, in general formula (XIII) and general formula (XIV) include methylene, ethylene, propane-1,3-diyl, butane-1,3-diyl, butane-1,4-diyl, pentane-1,3-diyl, pentane-1,5-diyl, hexane-1,3-diyl, hexane-1,6-diyl, heptane-1,3-diyl, heptane-1,7-diyl, octane-1,8-diyl, nonane-1,9-diyl, decane-1,10-diyl, cyclopentane-1,3-diyl, cyclohexane-1,4-diyl groups, and the like. Propane-1,3-diyl group is particularly preferable among these examples.

$R^5$ when p=0 and $R^6$ when q=0 each represent a hydrogen atom or a $C_{1-20}$ monovalent hydrocarbon group like $R^2$ and $R^3$ in each of general formula (XIII) and general formula (XIV). That is, the number of valence bond of $R^5$ is (p+1) and the number of valence bond of $R^6$ is (q+1).

Specific examples of the $C_{1-20}$ monovalent hydrocarbon group, as $R^2$, $R^3$, $R^5$ when p=0, and $R^6$ when q=0, in general formula (XIII) and general formula (XIV) include methyl, ethyl, propyl, isopropyl, n-butyl, sec-butyl, tert-butyl, n-pentyl, n-hexyl, n-heptyl, n-octyl, stearyl groups, and the like. Methyl group and ethyl group are preferable among these examples.

Specific preferable examples of the organic silane compound represented by general formula (XIII) include, as epoxy/thioepoxy group-containing silane compounds, (2-glycidoxyethyl)dimethylmethoxysilane, (2-glycidoxyethyl)diethylmethoxysilane, (2-glycidoxyethyl)dimethylethoxysilane, (2-glycidoxyethyl)diethylethoxysilane, (3-glycidoxypropyl)dimethylmethoxysilane, (3-glycidoxypropyl)diethylmethoxysilane, (3-glycidoxypropyl)dimethylethoxysilane, (3-glycidoxypropyl)diethylethoxysilane, 2-(3,4-epoxycyclohexyl)ethyl(dimethyl)methoxysilane, 2-(3,4-epoxycyclohexyl)ethyl(diethyl)methoxysilane, 2-(3,4-epoxycyclohexyl)ethyl(dimethyl)ethoxysilane, 2-(3,4-epoxycyclohexyl)ethyl(diethyl)ethoxysilane, and compounds obtained by substituting epoxy groups thereof with thioepoxy groups. (3-glycidoxypropyl)dimethylmethoxysilane, (3-glycidoxypropyl)diethylmethoxysilane, 2-(3,4-epoxycyclohexyl)ethyl(dimethyl)methoxysilane, and 2-(3,4-epoxycyclohexyl)ethyl(diethyl)methoxysilane are preferable among these examples.

Specific examples of the organic silane compound represented by general formula (XIII) include, as silane compounds containing a residual group of imine, N-(1,3-dimethylbutylidene)-3-(dimethylethoxysilyl)-1-propaneamine, N-(1,3-dimethylbutylidene)-3-(diethylethoxysilyl)-1-propaneamine, N-(1-methylethylidene)-3-(dimethylethoxysilyl)-1-propaneamine, N-(1-methylethylidene)-3-(diethylethoxysilyl)-1-propaneamine, N-ethylidene-3-(dimethylethoxysilyl)-1-propaneamine, N-ethylidene-3-(diethylethoxysilyl)-1-propaneamine, N-(1-methylpropylidene)-3-(dimethylethoxysilyl)-1-propaneamine, N-(1-methylpropylidene)-3-(diethylethoxysilyl)-1-propaneamine, N-(4-N,N-dimethylaminobenzylidene)-3-(dimethylethoxysilyl)-1-propaneamine, N-(4-N,N-dimethylaminobenzylidene)-3-(diethylethoxysilyl)-1-propaneamine, N-(cyclohexylidene)-3-(dimethylethoxysilyl)-1-propaneamine, N-(cyclohexylidene)-3-(diethylethoxysilyl)-1-propaneamine, and the like. N-(1-methylpropylidene)-3-(dimethylethoxysilyl)-1-propaneamine, N-(1-methylpropylidene)-3-(diethylethoxysilyl)-1-propaneamine, N-(1,3-dimethylbutylidene)-3-(dimethylethoxysilyl)-1-propaneamine, N-(1,3-dimethylbutylidene)-3-(diethylethoxysilyl)-1-propaneamine are preferable among these examples.

Specific examples of the organic silane compound represented by general formula (XIII) include, as imino(amidine) group-containing compounds, 1-[3-(dimethylethoxysilyl)propyl]-4,5-dihydroimidazole, 1-[3-(diethylethoxysilyl)propyl]-4,5-dihydroimidazole, 1-[3-(dimethylmethoxysilyl)propyl]-4,5-dihydroimidazole, 1-[3-(diethylmethoxysilyl)propyl]-4,5-dihydroimidazole, 3-[10-(dimethylethoxysilyl)decyl]-4-oxazoline, 3-[10-(diethylethoxysilyl)decyl]-4-oxazoline, 3-(1-hexamethyleneimino)propyl(dimethylethoxy)silane, 3-(1-hexamethyleneimino)propyl(diethylethoxy)silane, (1-hexamethyleneimino)methyl(dimethylmethoxy)silane, (1-hexamethyleneimino)methyl(diethylmethoxy)silane, 1-[3-(dimethylethoxysilyl)propyl]-4,5-dihydroimidazole, 1-[3-(diethylethoxysilyl)propyl]-4,5-dihydroimidazole, 1-[3-(dimethylmethoxysilyl)propyl]-4,5-dihydroimidazole, 1-[3-(diethylmethoxysilyl)propyl]-4,5-dihydroimidazole, and the like. 3-(1-hexamethyleneimino)propyl(dimethylethoxy)silane, 3-(1-hexamethyleneimino)propyl(diethylethoxy)silane, (1-hexamethyleneimino)methyl(dimethylmethoxy)silane, (1-hexamethyleneimino)methyl(diethylmethoxy)silane, 1-[3-(dimethylethoxysilyl)propyl]-4,5-dihydroimidazole, 1-[3-(diethylethoxysilyl)propyl]-4,5-dihydroimidazole, 1-[3-(dimethylmethoxysilyl)propyl]-4,5-dihydroimidazole, 1-[3-(diethylmethoxysilyl)propyl]-4,5-dihydroimidazole are preferable among these examples.

Specific examples of the organic silane compound represented by general formula (XIII) include, as carboxylic acid ester group-containing compounds, (3-methacryloyloxypropyl)dimethylethoxysilane, (3-methacryloyloxypropyl)diethylethoxysilane, (3-methacryloyloxypropyl)dimethylmethoxysilane, (3-methacryloyloxypropyl)diethylmethoxysilane, (3-methacryloyloxypropyl)dimethylisopropoxysilane, (3-methacryloyloxypropyl)diethylisopropoxysilane, and the like. (3-methacryloyloxypropyl)dimethylmethoxysilane and (3-methacryloyloxypropyl)diethylmethoxysilane are preferable among these examples.

Specific examples of the organic silane compound represented by general formula (XIII) include, as isocyanate group-containing compounds, (3-isocyanatepropyl)dimethylmethoxysilane, (3-isocyanatepropyl)diethylmethoxysilane, (3-isocyanatepropyl)dimethylethoxysilane, (3-isocyanatepropyl)diethylethoxysilane, (3-isocyanatepropyl)dimethylisopropoxysilane, (3-isocyanatepropyl)diethylisopropoxysilane, and the like. (3-isocyanatepropyl)dimethylethoxysilane and (3-isocyanatepropyl)diethylethoxysilane are preferable among these examples.

Specific examples of the organic silane compound represented by general formula (X III) include, as carboxylic acid anhydride-containing compounds, 3-(dimethylethoxy)silylpropyl succinic anhydride, 3-(diethylethoxy)silylpropyl succinic anhydride, 3-(dimethylmethoxy)silylpropyl succinic anhydride, 3-(diethylmethoxy)silylpropyl succinic anhydride, and the like. 3-(dimethylethoxy)silylpropyl succinic anhydride and 3-(diethylethoxy)silylpropyl succinic anhydride are preferable among these examples.

Examples of the organic silane compound represented by general formula (XIV) include protected primary amino group-containing hydrocarbyloxy silane compounds, wherein the protected amino group has as protecting groups two trialkylsilyl groups each represented as —SiR$^a$R$^b$R$^c$ (R$^a$, R$^b$ and R$^c$ each independently represent a C$_{1-12}$ alkyl group and preferable example thereof include methyl, ethyl, propyl, and butyl groups). Specific preferable examples of the protected primary amino group-containing hydrocarbyloxy silane compounds include N,N-bis(trimethylsilyl)aminopropylmethyldimethoxysilane, N,N-bis(trimethylsilyl)aminopropylmethyldiethoxysilane, N,N-bis(trimethylsilyl)aminoethylmethyldimethoxysilane, N,N-bis(trimethylsilyl)aminoethylmethyldiethoxysilane, and the like. N,N-bis(trimethylsilyl)aminopropylmethyldimethoxysilane, N,N-bis(trimethylsilyl)aminopropylmethyldiethoxysilane are particularly preferable among these examples.

Examples of the organic silane compound represented by general formula (XIV) include protected secondary amino group-containing hydrocarbyloxy silane compounds, wherein the protected amino group has as a protecting group a trialkylsilyl group represented as —SiR$^a$R$^b$R$^c$ (R$^a$, R$^b$ and R$^c$ are defined as described above). Specific preferable examples of the protected secondary amino group-containing hydrocarbyloxy silane compounds include N,N-methyl(trimethylsilyl)aminopropylmethyldimethoxysilane, N,N-ethyl(trimethylsilyl)aminopropylmethyldimethoxysilane, N,N-methyl(trimethylsilyl)aminopropylmethyldiethoxysilane, N,N-ethyl(trimethylsilyl)aminopropylmethyldiethoxysilane, N,N-methyl(trimethylsilyl)aminoethylmethyldimethoxysilane, N,N-ethyl(trimethylsilyl)aminoethylmethyldimethoxysilane, N,N-methyl(trimethylsilyl)aminoethylmethyldiethoxysilane, N,N-ethyl(trimethylsilyl)aminoethylmethyldiethoxysilane, and the like.

Further, other specific preferable examples of the organic silane compound represented by general formula (XIV) include hydrocarbyloxy silane compounds containing a residual group of imine such as N-(1,3-dimethylbutylidene)-3-(methyldiethoxysilyl)-1-propaneamine, N-(1-methylethylidene)-3-(methyldiethoxysilyl)-1-propaneamine, N-ethylidene-3-(methyldiethoxysilyl)-1-propaneamine, N-(1-methylpropylidene)-3-(methyldiethoxysilyl)-1-propaneamine, N-(4-N,N-dimethylaminobenzylidene)-3-(methyldiethoxysilyl)-1-propaneamine, N-(cyclohexylidene)-3-(methyldiethoxysilyl)-1-propaneamine, and methyldimethoxysilyl compounds, ethyldiethoxysilyl compounds, ethyldimethoxysilyl compounds corresponding to the aforementioned methyldiethoxysilyl compounds. N-(1-methylpropylidene)-3-(methyldiethoxysilyl)-1-propaneamine and N-(1,3-dimethylbutylidene)-3-(methyldiethoxysilyl)-1-propaneamine are particularly preferable among these examples.

Yet further, other specific preferable examples of the organic silane compound represented by general formula (XIV) include hydrocarbyloxy silane compounds each containing non-cyclic tertiary amino group, such as 3-dimethylaminopropyl(diethoxy)methylsilane, 3-dimethylaminopropyl(dimethoxy)methylsilane, 3-diethylaminopropyl(diethoxy)methylsilane, 3-diethylaminopropyl(dimethoxy)methylsilane, 2-dimethylaminoethyl(diethoxy)methylsilane, 2-dimethylaminoethyl(dimethoxy)methylsilane, and the like. 3-dimethylaminopropyl(dimethoxy)methylsilane and 3-dimethylaminopropyl(diethoxy)methylsilane are preferable among these examples.

Yet further, other specific preferable examples of the organic silane compound represented by general formula (XIV) include hydrocarbyloxy silane compounds each containing non-cyclic secondary amino group, such as 3-methylaminopropyl(diethoxy)methylsilane, 3-methylaminopropyl(dimethoxy)methylsilane, 3-ethylaminopropyl(diethoxy)

methylsilane, 3-ethylaminopropyl(dimethoxy)methylsilane, 2-methylaminoethyl(diethoxy)methylsilane, 2-methylaminoethyl(dimethoxy)methylsilane, and the like. 3-methylaminopropyl(diethoxy)methylsilane and 3-methylaminopropyl (dimethoxy)methylsilane are preferable among these examples.

Yet further, other specific preferable examples of the organic silane compound represented by general formula (XIV) include hydrocarbyloxy silane compounds each containing cyclic tertiary amino group, such as 3-(1-hexamethyleneimino)propyl(methyldiethoxy)silane, 3-(1-hexamethyleneimino)propyl(methyldimethoxy)silane, (1-hexamethyleneimino)methyl(methyldimethoxy)silane, (1-hexamethyleneimino)methy(methyldiethoxy)silane, 2-(1-hexamethyleneimino)ethyl(methyldiethoxy)silane, 2-(1-hexamethyleneimino)ethyl(methyldimethoxy)silane, 3-(1-pyrrolidinyl)propyl(methyldiethoxy)silane, 3-(1-pyrrolidinyl)propyl(methyldimethoxy)silane, 3-(1-heptamethyleneimino) propyl(methyldiethoxy)silane, 3-(1-dodecamethyleneimino) propyl(methyldiethoxy)silane, 3-(1-hexamethyleneimino) propyl(ethyldiethoxy)silane, 3-[10-(methyldiethoxysilyl)decyl]-4-oxazoline, and the like. 3-(1-hexamethyleneimino)propyl(methyldiethoxy)silane and (1-hexamethyleneimino)methyl(methyldimethoxy)silane are particularly preferable and 3-(1-hexamethyleneimino) propyl(methyldiethoxy)silane is the most preferable among these examples.

Yet further, other specific examples of the organic silane compound represented by general formula (XIV) include amidine group-containing hydrocarbyloxy silane compounds such as N-(3-methyldimethoxysilylpropyl)-4,5-dihydroimidazole, N-(3-methyldiethoxysilylpropyl)-4,5-dihydroimidazole, and like. N-(3-methyldiethoxysilylpropyl)-4,5-dihydroimidazole is preferable among these examples.

Yet further, other specific preferable examples of the organic silane compound represented by general formula (XIV) include epoxy group-containing hydrocarbyloxy silane compounds such as (2-glycidoxyethyl)methyldimethoxysilane, (2-glycidoxyethyl)methyldiethoxysilane, (2-glycidoxyethyl)ethyldimethoxysilane, (2-glycidoxyethyl)ethyldiethoxysilane, (3-glycidoxypropyl)methyldimethoxysilane, (3-glycidoxypropyl)methyldiethoxysilane, (3-glycidoxypropyl)ethyldimethoxysilane, (3-glycidoxypropyl)ethyldiethoxysilane, 2-(3,4-epoxycyclohexyl)ethyl (methyldimethoxy)silane, 2-(3,4-epoxycyclohexyl)ethyl (methyldiethoxy)silane, 2-(3,4-epoxycyclohexyl)ethyl (ethyldimethoxy)silane, 2-(3,4-epoxycyclohexyl)ethyl (ethyldiethoxy)silane, and the like. (3-glycidoxypropyl) methyldimethoxysilane, (3-glycidoxypropyl) methyldiethoxysilane are particularly preferable among these examples.

In this regard, epithio group-containing hydrocarbyloxy silane compounds obtained by substituting the epoxy groups of the epoxy group-containing hydrocarbyloxy silane compounds described above with epithio groups can also be preferably used as the organic silane compound.

Yet further, other specific examples of the organic silane compound represented by general formula (XIV) include isocyanate group-containing hydrocarbyloxy silane compounds such as (3-isocyanatopropyl)methyldimethoxysilane, (3-isocyanatopropyl)methyldiethoxysilane, (3-isocyanatopropyl)ethyldimethoxysilane, (3-isocyanatopropyl) ethyldiethoxysilane, (3-isocyanatopropyl) methyldiisopropoxysilane, (3-isocyanatopropyl) ethyldiisopropoxysilane, and the like. (3-isocyanatopropyl) methyldiethoxysilane is preferable among these examples.

Yet further, other specific examples of the organic silane compound represented by general formula (XIV) include hydrocarbyloxy silane compounds containing a residual group of carboxylic acid hydrocarbyl ester such as 3-methacryloyloxypropylmethyldiethoxysilane, 3-methacryloyloxypropylmethyldimethoxysilane, 3-methacryloyloxypropylethyldimethoxysilane, 3-methacryloyloxypropylethyldiethoxysilane, 3-methacryloyloxypropylmethyldiisopropxysilane, and the like. 3-methacryloyloxypropylmethyldimethoxysilane and 3-methacryloyloxypropylmethyldiethoxysilane are preferable among these examples.

Yet further, other specific examples of the organic silane compound represented by general formula (XIV) include hydrocarbyloxy silane compounds containing a residual group of carboxylic acid anhydride such as 3-(methyldiethoxysilyl)propyl succinic anhydride, 3-(methyldimethoxysilyl)propyl succinic anhydride, and the like. 3-(methyldiethoxysilyl)propyl succinic anhydride is preferable among these examples.

In this regard, 2-(methyldimethoxysilylethyl)pyridine, 2-(methyldiethoxysilylethyl)pyridine, 2-cyanoethylmethyldiethoxysilane, and the like can also be used as the organic silane compound.

The hydrocarbyloxy silane compounds having amino group or a residual group of imine are preferable among the aforementioned various types of organic silane compounds represented by general formula (XIV) in terms of improving low heat generation properties. The hydrocarbyloxy silane compounds having a protected primary amino group described above are particularly preferable among these preferable examples of the hydrocarbyloxy silane compounds. Low heat generation properties of the rubber composition blended with the modified conjugated diene polymer significantly improve by introduction of the protected primary amino group to the terminal end of a molecular chain of the modified conjugated diene polymer.

The method for producing a modified conjugated diene polymer of the present invention may further optionally include a preliminary modification reaction process of reacting the active site of the conjugated diene polymer with a hydrocarbyloxy silane compound prior to the modification reaction process of reacting the active site of the conjugated diene polymer with the organic silane compound. In this regard, the hydrocarbyloxy silane compound for use in the preliminary modification reaction process preferably has a plurality of hydrocarbyloxysilyl groups because then, when one of the hydrocarbyloxysilyl groups has been reacted with the active site of the conjugated diene polymer and thus consumed, the modification reaction process essential for the method for producing the modified conjugated diene polymer of the present invention can be reliably carried out by the remaining hydrocarbyloxysilyl groups.

Examples of the conjugated diene monomer for use in the conjugated diene polymer in the method for producing a modified conjugated diene polymer of the present invention include 1,3-butadiene, isoprene, 1,3-pentadiene, 2,3-dimethyl-1,3-butadiene, 2-phenyl-1,3-butadiene, 1,3-hexadiene, and the like. These examples may be used either solely as single type or in combination of two or more types. 1,3-butadiene is particularly preferable among these examples. Further, examples of aromatic vinyl monomer for use in the conjugated diene polymer include styreren, α-methylstyrene, 1-vinylnaphthalene, 3-vinyltoluene, ethylvinylbenzene, divinylbenzene, 4-cyclohexylstyrene, 2,4,6-trimethylstyrene, and the like. These examples may be used either solely as single type or in combination of two or more types. Styrene is particularly preferable among these examples.

The conjugated diene polymer in the method for producing a modified conjugated diene polymer of the present invention is preferably polybutadiene, polyisoprene, butadiene-isoprene copolymer, styrene-butadiene copolymer, styrene-isoprene copolymer or styrene-isoprene-butadiene terpolymer. Polybutadiene and styrene-butadiene copolymer are particularly preferable among these examples.

(Silane Coupling Agent)

The rubber composition for a tire of the present invention is blended with 1 to 20 parts by mass, preferably 3 to 16 parts by mass, and more preferably 5 to 12 parts by mass of a silane coupling agent with respect to 100 parts by mass of the hydrated silica. It is possible to further improve an effect caused by inclusion of the hydrated silica and physical properties such as low heat generation properties and storage modulus of the rubber composition by adding at least 1 part by mass of the silane coupling agent with respect to 100 parts by mass of the hydrated silica to the rubber composition. In this regard, adding the silane coupling agent by more than 20 parts by mass to the rubber composition for a tire of the present invention fails to contribute to improving low heat generation properties and storage modulus of the rubber composition and may rather increase production cost.

Preferable examples of the silane coupling agent include:
a compound represented by following formula (IV)

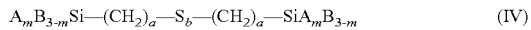

$$A_mB_{3-m}Si-(CH_2)_a-S_b-(CH_2)_a-SiA_mB_{3-m} \quad (IV)$$

[In formula (IV), A, B, m, a, and b are defined as described in JP 2007-138069, i.e. "A" represents $C_nH_{2n+1}O$ ("n" represents integer in the range of 1 to 3) or chlorine atom, "B" represents $C_{1-3}$ alkyl group, "m" represents integer in the range of 1 to 3, "a" represents integer in the range of 1 to 9, and "b" represents integer equal to or larger than 1 and may have a specific distribution. When m=1, "B"s may be of the same type or different types. When m=2 or 3, "A"s may be of the same type or different types.];

a compound represented by following formula (V)

$$A_mB_{3-m}Si-(CH_2)_c-Y \quad (V)$$

[In formula (V), A, B, Y, m, and c are defined as described in JP 2007-138069, i.e. "A" represents $C_nH_{2n+1}O$ ("n" represents integer in the range of 1 to 3) or chlorine atom, "B" represents $C_{1-3}$ alkyl group, "Y" represents mercapto, vinyl, amino, glycidoxy or epoxy group, "m" represents integer in the range of 1 to 3, and "c" represents integer in the range of 1 to 9. When m=1, "B"s may be of the same type or different types. When m=2 or 3, "A"s may be of the same type or different types.];

a compound represented by following formula (VI)

$$A_mB_{3-m}Si-(CH_2)_a-S_b-Z \quad (VI)$$

[In formula (VI), A, B, Z, m, a, and b are defined as described above in JP 2007-138069, i.e. "A" represents $C_nH_{2n+1O}$ ("n" represents integer in the range of 1 to 3) or chlorine atom, "B" represents $C_{1-3}$ alkyl group, "Z" represents benzothiazoryl, N,N-dimethylthiocarbamoyl or methacryloyl group, "m" represents integer in the range of 1 to 3, "a" represents integer in the range of 1 to 9, and "b" represents integer equal to or larger than 1 and may have a specific distribution. When m=1, "B"s may be of the same type or different types. When m=2 or 3, "A"s may be of the same type or different types.]; and a compound represented by following formula (VII)

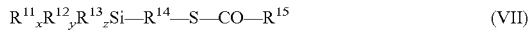

$$R^{11}{}_xR^{12}{}_yR^{13}{}_zSi-R^{14}-S-CO-R^{15} \quad (VII)$$

[In formula (VII), $R^{11}$, $R^{12}$, $R^{13}$, $R^{14}$, $R^{15}$, x, y, and z are as described in JP 2007-138069, i.e. "$R^{11}$" is selected from the group consisting of $R^6O$—, $R^6C(-O)O$—, $R^6R^7C=NO$—, $R^6R^7NO$—, $R^6R^7N$—, and —$(OSiR^6R^7)_n(OSiR^5R^6R^7)$ and the number of carbon atoms of $R^{11}$ is in the range of 1 to 18 (provided that $R^6$ and $R^7$ are independently selected from the group consisting of alkyl, cycloalkyl, alkenyl, cycloalkenyl and aryl groups, the number of carbon atoms of $R^6$ and $R^7$ is in the range of 1 to 18, "n" is an integer in the range of 0 to 10); "$R^{12}$" is selected from $C_{1-18}$ alkyl, $C_{1-18}$ cycloalkyl, $C_{1-18}$ alkenyl, $C_{1-18}$ cycloalkenyl and $C_{1-18}$ aryl groups; "$R^{13}$" is selected from —$[O(R^8O)_m]_{0.5}$— (provided that $R_8$ is selected from $C_{1-18}$ alkylene group and $C_{1-18}$ cycloalkylene group and "m" represents integer in the range of 1 to 4); x, y and z satisfy equations including x+y+2z=3, 0≤x≤3, 0≤y≤2, and 0≤z≤1; "$R^{14}$" is selected from $C_{1-18}$ alkylene, $C_{1-18}$ cycloalkylene, $C_{1-18}$ cycloalkylalkylene, $C_{1-18}$ alkenylene, $C_{1-18}$ arylene, and $C_{1-18}$ aralkylene groups; and "$R^{15}$" is selected from $C_{1-18}$ alkyl, $C_{1-18}$ cycloalkyl, $C_{1-18}$ alkenyl, $C_{1-18}$ cycloalkenyl, $C_{1-18}$ aryl, and $C_{1-18}$ aralkyl groups.].

These examples of the silane coupling agent may be used either solely as single type or in combination of two or more types.

Examples of the compound represented by formula (IV) include bis(3-triethoxysilylpropyl)tetrasulfide, bis(3-trimethoxysilylpropyl)tetrasulfide, bis(3-methyldimethoxysilylpropyl)tetrasulfide, bis(3-triethoxysilylethyl)tetrasulfide, bis(3-triethoxysilylpropyl)disulfide, bis(3-trimethoxysilylpropyl)disulfide, bis(3-triethoxysilylpropyl)trisulfide, and the like.

Examples of the compound represented by formula (V) include 3-mercaptopropyltrimethoxysilane, 3-mercaptopropyltriethoxysilane, vinyltriethoxysilane, vinyltrimethoxysilane, 3-aminopropyltriethoxysilane, 3-aminopropyltrimethoxysilane, 3-mercaptopropylmethyldimethoxysilane, γ-glycidoxypropyltrimethoxysilane, γ-glycidoxypropylmethyldiethoxysilane, and the like. Examples of a commercially available products of these compounds include "VPSi363" manufactured by Evonik Degussa GmbH.

Examples of the compound represented by formula (VI) include 3-trimethoxysilylpropyl-N,N-dimethylcarbamoyl tetrasulfide, 3-trimethoxysilylpropylbenzothiazolyl tetrasulfide, 3-trimethoxysilylpropylmethacryloyl monosulfide, and the like.

$R^{12}$, $R^{15}$, $R^{16}$ and $R^{17}$ of the compound represented by formula (VII) each represent normal/branched alkyl, normal/branched alkenyl, cycloalkyl, cycloalkenyl, or aryl group. Examples of the alkyl group include methyl, ethyl, propyl, isoproplyl groups, and the like. Examples of the alkenyl group include vinyl, allyl, methanyl groups, and the like. Examples of the cycloalkyl group include cyclohexyl, ethylcyclohexyl groups, and the like. Examples of the cycloalkenyl group include cyclohexenyl, ethylcyclohexenyl groups, and the like. Examples of the aryl group include phenyl, tolyl groups, and the like. $R^{15}$ may be aralkyl group and examples thereof include phenethyl group and the like.

$R^{14}$ and $R^{18}$ of the compound represented by formula (VII) each represent normal/branched alkylene or cycloalkylene group. Examples of the alkylene group include methylene, ethylene, trimethylene, propylene groups, and the like. Examples of the cycloalkylene group include cyclohexylene group, and the like. Alternatively, $R^{14}$ may represent normal/branched alkenylene, cycloalkylalkylene, arylene, or aralkylene group. Examples of the alkenylene group include vinylene, propenylene groups, and the like. Examples of the cycloalkylalkylene group include cyclohexylmethylene group, and the like. Examples of the arylene group include phenylene group, and the like. Examples of the aralkylene group include xylylene group, and the like.

Regarding $R^{13}$ in formula (VII), examples of —$[O(R^{18}O)_m]_{0.5}$— include 1,2-ethanedioxy, 1,3-propanedioxy, 1,4-butanedioxy, 1,5-pentanedioxy, 1,6-hexanedioxy groups, and the like.

The compound represented by formula (VII) can be synthesized by a method similar to the method disclosed in JP 2001-505225. Alternatively, it is acceptable to use a commercially available product such as product name "NXT" (3-octanoylthiopropyltriethoxysilane, in which $R^{11}$=$C_2H_5O$, $R_{14}$=$C_3H_6$, $R^{15}$=$C_7H_{15}$, x=3, y=0, z=0 in formula (VII)), manufactured by Momentive Performance Materials Inc. The compound represented by formula (V) or the compound represented by formula (VII) is preferable among the compounds represented by formulae (IV), (V), (VI) and (VII).

Examples of the silane coupling agent which can be used include a predetermined organic silicon compound having in a molecule thereof at least one sulfur atom (S) and a ring structure including nitrogen atom (N) and silicon atom (Si).

The aforementioned organic silicon compound, having a nitrogen-including functional group such as amino, imino, substituted amino, substituted imino group exhibiting high affinity for a surface of an inorganic filler like silica, is quickly reacted and coupled with the inorganic filler because an unshared electron pair of the nitrogen atom can involve a reaction between the organic silicon compound and the organic filler. In this connection, the organic silicon compound exhibits relatively low reactivity to the inorganic filler and thus significantly low coupling efficiency therewith when the ring structure including nitrogen atom (N) and silicon atom (Si) is a bicyclic compound due to the large steric hindrance around the silicon atom. The organic silicon compound used in the present invention, however, is highly reactive to an inorganic filler like silica because at least one group having only small steric hindrance is bonded to the silicon atom in the organic silicon compound. Accordingly, it is possible to improve the coupling efficiency of an organic silicon compound with an inorganic filler and thus significantly enhance wear resistance, while significantly reducing hysteresis loss of a rubber composition, by adding the organic silicon compound of the present invention, instead of the conventional silane coupling agent, to the rubber composition to be blended with inorganic filler. Further, the organic silicon compound of the present invention exhibits a high addition effect, i.e. achieves a good effect by a small amount, thereby contributing to reduction of the cost involved with blending.

Hydrogen atom (—H), methyl group (—$CH_3$), hydroxyl group (—OH) and the like are preferable as the "group having small steric hindrance". The organic silicon compound, when hydrogen atom, methyl group or hydroxyl group is bonded to the silicon atom (Si) thereof, exhibits especially high reactivity with an inorganic filler and thus can significantly improve the coupling efficiency with respect to the inorganic filler. The organic silicon compound preferably has 1 to 6 silicon-oxygen bonds (Si—O) therein. The organic silicon compound exhibits high reactivity with an inorganic filler like silica and thus a further improved coupling efficiency with the inorganic filler when the organic silicon compound 1 to 6 silicon-oxygen bonds (Si—O).

Specifically, a compound represented by general formula (I) shown below is preferable as the organic silicon compound for use in the present invention. Examples of the organic silicon compound may be used either solely as single type or in combination of two or more types.

In general formula (1), "A" represents a group having a sulfur atom (S) and reactive to a rubber component; $R^{11}$ and $R^{12}$ each independently represent -M-$C_lH_{2l}$— ("M" represents —O— or —$CH_2$— and "l" represents an integer in the range of 0 to 10), provided that "M" is —O— in at least one of $R^{11}$ and $R^{12}$; $R^{13}$ represents hydrogen atom, methyl group or hydroxyl group; and $R^{14}$ represents —$C_nH_{2n+1}$—, wherein "n" represents an integer in the range of 0 to 20.

In general formula (1), "A" represents a group having a sulfur atom (S) and reactive to a rubber component. The organic silicon compound represented by general formula (1), having a ring structure portion reactive to an inorganic filler like silica and a group reactive to the rubber component in a molecule thereof, is capable of coupling the rubber component with the inorganic filler. In this connection, the group having a sulfur atom (S) and reactive to a rubber component is preferably at least one group selected from the group consisting of polysulfide group, thioester group, thiol group, dithiocarbonate group, dithioacetal group, hemithioacetal group, vinylthio group, α-thiocarbonyl group, β-thiocarbonyl group, S—CO—$CH_2$—O portion, S—CO—CO portion (thiodiketone group), and S—$CH_2$—Si portion, and particularly preferably includes at least one of polysulfide group and thioester group.

In general formula (1), $R^{11}$ and $R^{12}$ each independently represent -M-$C_lH_{2l}$— ("M" represents —O— or —$CH_2$— and "l" represents an integer in the range of 0 to 10), provided that "M" is —O— in at least one of $R^{11}$ and $R^{12}$. "-M-$C_lH_{2l}$—", wherein "l" is an integer in the range of 0 to 10, represents a single bond or a $C_{1-10}$ alkylene group. Examples of the $C_{1-10}$ alkylene group include methylene, ethylene, trimethylene, propylene groups, and the like. The alkylene group is either normal or branched.

In general formula (1), $R^{13}$ represents hydrogen atom, methyl group or hydroxyl group. $R^{13}$, causing relatively small steric hindrance, significantly contributes to improving the coupling reaction between the rubber component and the inorganic filler.

In general formula (1), $R^{14}$ represents —$C_nH_{2n+1}$—, wherein "n" represents an integer in the range of 0 to 20. "—$C_nH_{2n+1}$—", wherein "n" is an integer in the range of 0 to 20, is hydrogen or a $C_{1-20}$ alkyl group. Examples of the $C_{1-20}$ alkyl group include methyl, ethyl, propyl, butyl, pentyl, hexyl, octyl, decyl, undecyl, dodecyl, nonadecyl, eicosyl groups, and the like. The alkyl group is either normal or branched.

"A" in general formula (1) is preferably represented by any of general formula (2), general formula (3) and general formula (4).

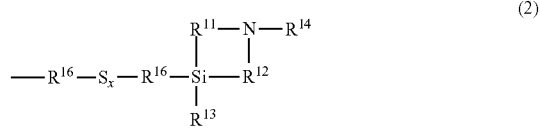

-continued

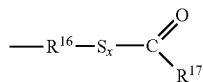
(3)

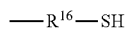
(4)

In general formula (2), $R^{11}$, $R^{12}$, $R^{13}$ and $R^{14}$ are defined in the same manner as in general formula (1). $R^{16}$ in general formulae (2) and (3) is represented by general formula (5) or general formula (6) shown below or represents $-M-C_lH_{2l}-$ ("M" and "l" are defined in the same manner as in general formula (1)).

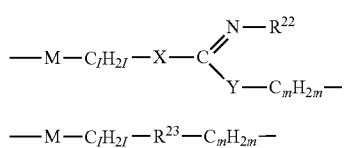
(5)

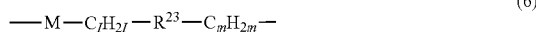
(6)

In general formulae (5) and (6), "M" and "l" are defined in the same manner as in general formula (1); "m" is an integer in the range of 0 to 10; "X" and "Y" each independently represent $-O-$, $-NR^{14}-$, or $-CH_2-$; $R^{22}$ represents $-OR^{14}$, $-NR^{14}R^{15}$, or $-R^{14}$; $R^{23}$ represents $-NR^{14}-$, $-NR^{14}-NR^{14}-$, or $-N=N-$; $R^{14}$ is defined in the same manner as in genera formula (1); and $R^{15}$ represents $C_qH_{2q+1}$, wherein "q" is an integer in the range of 1 to 10.

$R^{17}$ in general formula (3) is represented by general formula (7) or general formula (8) shown below or represents $-C_lH_{2l}-R^{25}$ ($R^{25}$ represents $-NR^{14}R^{15}$, $-NR^{14}-NR^{14}R^{15}$, $-N=NR^{14}$, -M-$C_mH_{2m+1}$, or a $C_{6-20}$ aromatic hydrocarbon, wherein $R^{14}$, $R^{15}$, M, I, and m are defined in the same manner as in general formulae (1) to (6)).

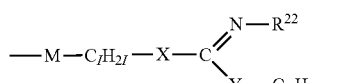
(7)

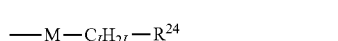
(8)

In formulae (7) and (8), M, X, Y, $R^{23}$, l and m are defined in the same manner as in general formula (5) and (6); $R^{24}$ represents $-NR^{14}R^{15}$, $-NR^{14}NR^{14}R^{15}$, or $-N=NR^{14}$. Further, "x" in general formulae (2) and (3) represents an integer preferably in the range of 1 to 10 and more preferably in the range of 2 to 4; $R^{18}$, $R^{19}$, and $R^{20}$ in general formula (4) each preferably represent -M-$C_pH_{2p}-$, wherein "M" represents $-O-$ or $-CH_2$ and "p" represents an integer in the range of 0 to 20; and $R^{11}$ represents H, OH, or methyl group.

In general formula (5) and (6), "M" represents $-O-$ or $-CH_2$ and "l" and "m" each represent an integer in the range of 0 to 10. In general formula (5), "X" and "Y" each independently represent $-O-$, $-NR^{14}-$, or $-CH_2-$ and $R^{22}$ represents $-OR^{14}$, $-NR^{14}R^{15}-$ or $-R^{14}$, wherein $R^{14}$ represents $-C_nH_{2n+1}$ and $R^{15}$ represents $C_qH_{2q+1}$. In general formula (6), $R^{23}$ represents $-NR^{14}-$, $-NR^{14}-NR^{14}-$ or $-N=N-$, wherein $R^{14}$ represents $-C_nH_{2n+1}$.

"$-C_nH_{2n+1}$" is defined as described above. "$-C_mH_{2m}-$" represents a single bond or a $C_{1-10}$ alkylene group because "m" is an integer in the range of 0 to 10. Examples of the $C_{1-10}$ alkylene group include methylene, ethylene, trimethylene, propylene groups, and the like. The alkylene group is either normal or branched. "$-C_qH_{2q+1}$" represents hydrogen or a $C_{1-10}$ alkyl group because "q" is an integer in the range of 0 to 10. Examples of the $C_{1-20}$ alkyl group include methyl, ethyl, propyl, butyl, pentyl, hexyl, heptyl, octyl, decyl groups, and the like. The alkyl group is either normal or branched.

$R^{17}$ in general formula (3) is represented by general formula (7) or general formula (8) above or represents $-C_lH_{2l}-R^{26}$. Preferably, $R^{17}$ represents $-C_lH_{2l+1}$. In this connection, M, X, Y, $R^{22}$, $R^{24}$, I, and m are defined in the same manner as in general formulae (1) to (6); $R^{26}$ represents $-NR^{14}R^{15}$, $-NR^{14}-NR^{14}R^{15}$, $-N=NR^{14}$, -M-$C_mH_{2m+1}$, or a $C_{6-20}$ aromatic hydrocarbon, wherein $R^{14}$, $R^{15}$, M, I, and m are defined in the same manner as in general formulae (1) to (6)).

"$-C_lH_{2l}-$" is defined as described above. "$-C_mH_{2m+1}$" represents hydrogen or a $C_{1-10}$ alkyl group because "m" is an integer in the range of 0 to 10. Examples of the $C_{1-20}$ alkyl group include methyl, ethyl, propyl, butyl, pentyl, hexyl, heptyl, octyl, decyl groups, and the like. The alkyl group is either normal or branched. Examples of a $C_{6-20}$ aromatic hydrocarbon group include: aryl groups such as phenyl, tolyl, xylyl, cumenyl, naphthylene, tolylene groups; and aralkyl groups such as benzyl, phenethyl groups.

"$-C_pH_{2p+1}-$" in general formula (4) represents a single bond or a $C_{1-20}$ alkylene group because "p" is an integer in the range of 0 to 20. Examples of the $C_{1-20}$ alkylene group include methylene, ethylene, trimethylene, propylene groups, decamethylene, eicosamethylene groups, and the like. The alkylene group is either normal or branched.

"M" is preferably $-O-$ (oxygen) in the compound represented by general formula (1) because then the compound is highly reactive to an inorganic filler like silica, as compared with a corresponding compound having $-CH_2-$ as M.

In general formula (1), it is preferable that: $R^{11}$ and $R^{12}$ each independently represent $-O-C_lH_{2l}-$; $R^3$ represents hydrogen atom, methyl group or hydroxyl group; $R^{16}$ represents $-O-C_lH_{2l}-$; $R^{17}$ represents a normal/branched alkyl group represented as $-O-C_lH_{2l}-$ or $C_{6-20}$ aromatic hydrocarbon group.

The organic silicon compound described above can be synthesized by, for example: adding an amine compound such as N-methyldiethanolamine, N-ethyldiethanolamine or the like to a compound represented by formula $(C_lH_{2l+1}O)_2R^{19}Si-A$, wherein l, $R^{13}$ and A are defined in the same manner as in general formula (1); further adding as catalyst an acid like p-toluenesulphonic acid, hydrochloric acid and/or a titanium alkoxide such as titanium tetra-n-butoxide to the mixture; and heating the mixture to allow the two $C_lH_{2l+1}O-$ groups to be substituted with a divalent group represented by formula $-R^{11}-NR^{14}-R^{12}-$.

The organic silicon compound described above has a ring structure containing nitrogen atom (N) and silicon atom (Si) therein and this ring structure is stable even in a case where the organic silicon compound includes a silicon-oxygen (Si—O) bond. Accordingly, an alcohol component is not generated when the silicon-oxygen (Si—O) bond is subjected to hydrolysis and generation of a volatile organic compound (VOC) in use can be effectively suppressed.

(Other Components)

The rubber composition for a tire of the present invention may be further blended with carbon black as a reinforcing filler. Content of the carbon black is to be 80 parts by mass or less (preferably 60 parts by mass or less) with respect to 100 parts by mass of the rubber component. Content of the carbon black>80 parts by mass with respect to 100 parts by mass may deteriorate low heat generation properties of the rubber composition. In this connection, the total content of the carbon black and the hydrated silica is to be 120 parts by mass or less (preferably 100 parts by mass or less) with respect to 100 parts by mass of the rubber component. It is possible to realize satisfactory low heat generation properties of the rubber composition to sufficiently improve rolling resistance thereof by setting the total content of the carbon black and the hydrated silica to be 120 parts by mass or less with respect to 100 parts by mass of the rubber component.

The rubber composition for a tire of the present invention can be blended with additives generally added to a rubber composition for a tire unless the addition of the additives adversely affects the effect of the present invention. For example, additives generally used in the rubber industry such as antioxidant, vulcanization accelerator, sulfur, zinc oxide, stearic acid, antiozonant, and the like may be added in an appropriate manner to the rubber composition for a tire of the present invention. The rubber composition for a tire of the present invention, obtained by kneading and mixing using an open-type kneader such as rolls or a sealed-type kneading machine such as a banbury mixer and then subjected to molding and vulcanization, is applicable to various types of rubber products.

A pneumatic tire of the present invention is characterized in that the aforementioned rubber composition is applied to any of tire constituting members thereof. The rubber composition for a tire of the present invention is most preferably applied to a tread among the tire constituting members. A tire using the rubber composition for a tire of the present invention in a tread thereof has relatively low rolling resistance and good wear resistance owing to the rubber composition. Examples of gas for inflating the tire of the present invention with include ambient air, air having adjusted oxygen partial pressure, and inert gas such as nitrogen.

EXAMPLES

The present invention will be described further in detail by Examples hereinafter. The present invention, however, is not restricted by these Examples. Physical properties of hydrated silica were evaluated by the following method.

<<Measurement of Ink Bottle-Shaped Micropore Index (IB)>>

IB was obtained by: measuring, according to a mercury press-in method using a mercury porosimeter "POREMASTER-33" manufactured by Quantachrome Instrument, mercury charge rate in micropores with openings in the range of $1.2 \times 10^5$ nm to 6 nm formed at outer surfaces of particles of hydrated silica by increasing pressure from 1 PSI to 32000 PSI; determining a diameter (M1) corresponding to the peak of mercury charge rate in mercury charge curve in the graph as shown in FIG. 2; then discharging mercury from the micropores by decreasing pressure from 32000 PSI to 1 PSI and determining a diameter (M2) corresponding to the peak of mercury discharge rate in the mercury discharge curve in the same graph; and calculating difference between M1 and M2.

<<Measurement of CTAB>>

CTAB was obtained according to the method disclosed in ASTM D3765-92 by: preparing cetyltrimethylammonium bromide (which will be referred to as "CE-TRAB" hereinafter) standard solution in place of "IRB#3" (83.0 m²/g) as the standard solution for carbon black measurement, as described above; carrying out standardization of hydrated silica OT (sodium di-2-ethylhexyl sulfosuccinate) solution by using the CE-TRAB standard solution; assuming that cross sectional area per one CE-TRAB molecule adsorbed on the hydrated silica surface is 0.35 nm²; and regarding a specific surface area (m²/g) calculated from an amount of CE-TRAB adsorption based on the aforementioned assumption as a value of CTAB.

<<Measurement of "Weight Loss on Ignition" and "Weight Loss on Heating">>

Samples of hydrated silica were prepared by weighing the hydrated silica. "Weight loss on ignition" (mass %) was determined by measuring decrease in mass after a sample was heated at 750° C. for 3 hours and calculating percentage of the decrease, i.e. difference in sample mass before and after heating, with respect to the sample mass before heating. "Weight loss on heating" (mass %) was determined by measuring decrease in mass after a sample was heated at 105° C. for 2 hours and calculating percentage of the decrease, i.e. difference in sample mass before and after heating, with respect to the sample mass before heating.

[Manufacture of Hydrated Silica A]

65 L of water and 1.25 L of sodium silicate aqueous solution ($SiO_2$: 160 g/L, molar ratio of $SiO_2/Na_2O$: 3.3) were charged into a jacketed stainless reaction vessel (180 L) provided with a stirrer. The mixture solution was heated at 96° C. $Na_2O$ concentration of the mixture solution thus prepared was 0.015 mol/L.

The same sodium silicate aqueous solution as described above and sulfuric acid (18 mol/L) were simultaneously added dropwise to the mixture solution at flow rates of 750 mL/minute and 33 mL/minute, respectively, while temperature of the mixture solution was maintained at 96° C. Neutralization was carried out with maintaining $Na_2O$ concentration in the reaction solution in the range of 0.005 mol/L to 0.035 mol/L by adjusting the aforementioned flow rates. The reaction solution turned opaque in the midway of the neutralization reaction and became a gel-like solution, due to increase in viscosity thereof, 30 minutes after the start of neutralization. Addition of the sodium silicate aqueous solution and sulfuric acid were continued and the neutralization reaction was stopped 100 minutes after the start of neutralization. Concentration of silica formed in a resulting solution was 85 g/L. The same sulfuric acid as described above was again added to the resulting solution until pH of the solution reached 3, whereby silicate slurry was obtained. The silicate slurry thus obtained was filtrated by a filter press and then rinsed with water, whereby wet cake was obtained. The wet cake thus obtained was rendered into slurry again by using an emulsifier and dried by a spray dryer, whereby wet method-based hydrated silica A was obtained.

[Manufacture of Hydrated Silica B]

89 L of water and 1.70 L of sodium silicate aqueous solution ($SiO_2$: 160 g/L, molar ratio of $SiO_2/Na_2O$: 3.3) were charged into a stainless reaction vessel of the same type as that in Manufacturing Example 1 of hydrated silica A. The mixture solution was heated at 75° C. $Na_2O$ concentration of the mixture solution thus prepared was 0.015 mol/L. The same sodium silicate aqueous solution as described above and sulfuric acid (18 mol/L) were simultaneously added dropwise to the mixture solution at flow rates of 520 mL/minute and 23 mL/minute, respectively, while temperature of the mixture solution was maintained at 75° C. Neutralization was carried out with maintaining Na$_2$O concentration in the reaction solution in the range of 0.005 mol/L to 0.035 mol/L by adjusting the aforementioned flow rates. The reaction solution turned opaque in the midway of the neutralization reaction and became a gel-like solution, due to increase in viscosity thereof, 46 minutes after the start of neutralization. Addition of the sodium silicate aqueous solution and sulfuric acid were continued and the neutralization reaction was stopped 100 minutes after the start of neutralization. Concentration of silica formed in a resulting solution was 60 g/L. The same sulfuric acid as described above was again added to the resulting solution until pH of the solution reached 3, whereby silicate slurry was obtained. The silicate slurry thus obtained was processed in the same manner as in Manufacturing Example 1, whereby wet method-based hydrated silica B was obtained.

CTAB, the value of the right side of formula (I), the value of the right side of formula (II), IB, and ("weight loss on ignition"–"weight loss on heating") were calculated for each of the respective hydrated silica A and hydrated silica B obtained by the aforementioned manufacturing methods and hydrated silica C as a commercially available hydrated silica ("Nipsil AQ", manufactured by Tosoh Silica Corporation). The

TABLE 1

|  | Hydrated silica A | Hydrated silica B | Hydrated silica C |
| --- | --- | --- | --- |
| CTAB | 79 | 180 | 165 |
| Value of the right side of formula (I) | 65.60 | — | — |
| Value of the right side of formula (II) | — | 24.0 | 27.0 |
| IB | 55.00 | 20.00 | 34.10 |
| "weight loss on ignition" – "weight loss on heating" (mass %) | 3.0 | 3.2 | 2.6 |

[Manufacture of Modified Polymer A]

Modified polymer A was prepared by: charging a cyclohexane solution of 1,3-butadiene (1,3-butadiene: 60 g) and a cyclohexane solution of styrene (styrene: 15 g) in a dry, nitrogen-substituted pressure-resistant glass vessel (800 mL); adding 0.72 mmol of hexamethyleneimine, 0.72 mmol of n-butyllithium, and 0.36 mmol of 2,2-di(tetrahydrofuryl) propane sequentially to the mixture; and allowing a polymerization reaction to proceed at 50° C. for 2 hours (the polymerization conversion rate was substantially 100%); then stopping the polymerization reaction by adding 0.5 ml of an isopropanol solution of 2,6-di-t-butyl-p-cresol (5 mass %) to the polymerization reaction system; and making the targeted polymer precipitate by adding a small amount of hydrochloric acid and isopropanol to the mixture and drying the precipitates by a conventional method, to obtain S-SBR (Modified polymer A).

[Manufacture of Modified Polymer B]

Modified polymer B was prepared by: charging a cyclohexane solution of 1,3-butadiene (1,3-butadiene: 60 g) and a cyclohexane solution of styrene (styrene: 15 g) in a dry, nitrogen-substituted pressure-resistant glass vessel (800 mL); adding 0.36 mmol of 2,2-di(tetrahydrofuryl)propane and then 0.72 mmol of n-butyllithium to the mixture; allowing a polymerization reaction to proceed in a warm bath at 50° C. for 1.5 hours (the polymerization conversion rate was substantially 100%); then adding 0.65 mmol of 3-(1,3-dimethylbutylidene)aminopropyltriethoxysilane to the polymerization system to allow a modification reaction to proceed at 50° C. for 30 minutes; stopping the polymerization reaction by adding 0.5 ml of an isopropanol solution of 2,6-di-t-butyl-p-cresol (5 mass %) to the polymerization reaction system; and drying the resulting polymer by a conventional method, to obtain SBR (Modified polymer B).

[Manufacture of Modified Polymers D, E, G and H]

SBRs as Modified polymers D, E, G and H were prepared under the same manufacturing conditions as Modified polymer B described above, except that modifying agents D, E, G and H were used in place of 3-(1,3-dimethylbutylidene) aminopropyltriethoxysilane in the formers.

[Manufacture of Modified Polymer F]

Modified polymer F was prepared by: charging a cyclohexane solution of 1,3-butadiene (1,3-butadiene: 60 g) and a cyclohexane solution of styrene (styrene: 15 g) in a dry, nitrogen-substituted pressure-resistant glass vessel (800 mL); adding 0.70 mmol of 2,2-di(tetrahydrofuryl)propane and then 0.70 mmol of n-butyllithium (BuLi) to the mixture; allowing a polymerization reaction to proceed in a warm bath at 50° C. for 1.5 hours (the polymerization conversion rate was substantially 100%); then adding 0.65 mmol of N,N-bis(trimethylsilyl)-3-aminopropylmethyldiethoxysilane (modification agent F) to the polymerization system to allow a modification reaction to proceed at 50° C. for 30 minutes; adding 1.5 ml of diluted hydrochloric acid dropwise and then water by an amount three times as much as the amount (mol) of Li to the polymerization system and stirring the mixture for 30 minutes; stopping the polymerization reaction by adding a solution of 2,6-di-tert-butyl-p-cresol (BHT) to the polymerization reaction system; blowing steam into the mixture to decrease partial pressure of the solvent (steam stripping) to remove the solvent; and drying the resulting polymer in vacuum, to obtain a modified conjugated diene copolymer (Modified polymer F).

[Manufacture of Polymer I]

Polymer I was prepared by: charging a cyclohexane solution of 1,3-butadiene (1,3-butadiene: 60 g) and a cyclohexane solution of styrene (styrene: 15 g) in a dry, nitrogen-substituted pressure-resistant glass vessel (800 mL); adding 0.70 mmol of 2,2-di(tetrahydrofuryl)propane and then 0.70 mmol of n-butyllithium (BiLi) to the mixture; allowing a polymerization reaction to proceed in a warm bath at 50° C. for 1.5 hours (the polymerization conversion rate was substantially 100%); then stopping the polymerization reaction by adding an isopropanol solution of 2,6-di-tert-butyl-p-cresol (BHT) to the polymerization reaction system; and drying the resulting polymer in vacuum, to obtain Polymer I.

[Manufacture of Modified Polymer J]

Modified polymer J was prepared under the same manufacturing conditions as Modified polymer B described above, except that tin tetrachloride (modifying agent J) was used in the former.

TABLE 2

| Type of modifying agent | Name of compound |
| --- | --- |
| B | 3-(1,3-dimethylbutylidene)aminopropyltriethoxysilane |
| D | N-methyl-1-trimethylsilylaminodiethoxy(methyl)silylpropane |
| E | N,N-bis(trimethylsilyl)-3-aminopropylethyldiethoxysilane |

TABLE 2-continued

| Type of modifying agent | Name of compound |
|---|---|
| F | N,N-bis(trimethylsilyl)-3-amino-propylmethyldiethoxysilane |
| G | N,N-bis(trimethylsilyl)-3-amino-propylmethyltriethoxysilane |
| H | 3-glycidoxypropyltrimethoxysilane |
| J | Tetrachloride |

Examples 1 to 9 and Comparative Example 1 to 11

Test rubber compositions were prepared by the conventional method according to blend prescription X1 or X2 (see Table 3) using the hydrated silica samples and the modified polymer samples shown in Table 4 and Table 5, respectively.

TABLE 3

| Blend prescription X1 | Blending quantity | Blend prescription X2 | Blending quantity |
|---|---|---|---|
| Modified polymer*1 | 100 | Modified polymer*1 | 70 |
|  |  | Isoprene rubber*9 | 30 |
| Aromatic oil | 36 | Aromatic oil | 25 |
| Carbon black*2 | 10 | Carbon black*2 | 8 |
| Hydrated silica*3 | 75 | Hydrated silica*3 | 80 |
| Silane coupling agent*4 | 7 | Silane coupling agent*4 | 8 |
| Stearic acid | 2 | Stearic acid | 2 |
| Antioxidant*5 | 1 | Antioxidant*5 | 1 |
| Zinc white | 3 | Zinc white | 3 |
| Vulcanization accelerator A*6 | 1 | Vulcanization accelerator A*6 | 1 |
| Vulcanization accelerator B*7 | 1 | Vulcanization accelerator B*7 | 1 |
| Vulcanization accelerator C*8 | 1 | Vulcanization accelerator C*8 | 1 |
| Sulfur | 1.5 | Sulfur | 1.5 |

Unit in Table 3 is parts by mass.
*1One of Polymers A to J (The selected polymer types are shown in Table 4)
*2"SEAST KH ® (N339)", manufactured by Tokai Carbon Co., Ltd.

TABLE 3-continued

| Blend prescription X1 | Blending quantity | Blend prescription X2 | Blending quantity |
|---|---|---|---|

*3One of Hydrated silica samples A to C (The selected hydrated silica samples are shown in Table 4)
*4"NXT ®", manufactured by Momentive Performance Material Inc.
*5N-(1,3-dimethylbutyl)-N'-phenyl-p-phenylenediamine, "Nocrac 6C", manufactured by Ouchi Shinko Chemical Industrial Co., Ltd.
*6Diphenylguanidine, "Nocceler D", manufactured by Ouchi Shinko Chemical Industrial Co., Ltd.
*7Benzothiazyl disulfide, "Nocceler DM-P", manufactured by Ouchi Shinko Chemical Industrial Co., Ltd.
*8N-t-butyl-2-benzothiazyl sulfenamide, "Nocceler NS-P", manufactured by Ouchi Shinko Chemical Industrial Co., Ltd.
*9"IR2200", manufactured by JSR Corporation

[Evaluation]

Rubber compositions of Examples and Comparative Examples were prepared as described above and sample tires each having size: 195/65R15 were prepared according to the conventional method by applying the rubber compositions to tread rubbers thereof, respectively. Wear resistance and rolling resistance of each of the sample tires were evaluated according to the methods described below, respectively. The results of Examples 1 to 4 and Comparative Examples 1 to 5 are shown in Table 4 and the results of Examples 5 to 10 and Comparative Examples 6 to 12 are shown in Table 5.

(1) Wear Resistance

Wear resistance was evaluated by: mounting each of the sample tires on a vehicle; measuring remaining tread groove depth of the tire after running 20,000 km; and expressing the remaining tread groove depth thus measured, as an index relative to the remaining tread groove depth of Comp. Example 1 (Table 4)/Comp. Example 6 (Table 5) being 100. The larger index value represents the better wear resistance.

(2) Rolling Resistance (Low Heat Generation Properties)

Rolling resistance was evaluated by: mounting each of the sample tires on an indoor drum tester type single-shaft rolling resistance measurement system; measuring tan δ when the tire was run at 80 km/hour, and expressing the tan δ thus measured, as an index relative to the tan δ of Comp. Example 1 (Table 4)/Comp. Example 6 (Table 5) being 100. The smaller index value represents the lower rolling resistance.

TABLE 4

|  | Conditions | | | Evaluation | |
|---|---|---|---|---|---|
|  | Type of polymer | Type of hydrated silica | Blend prescription | Wear resistance | Rolling resistance |
| Example 1 | Modified polymer A | Hydrated silica A | X1 | 130 | 91 |
| Example 2 | Modified polymer B | Hydrated silica A | X1 | 148 | 79 |
| Example 3 | Modified polymer D | Hydrated silica A | X1 | 153 | 76 |
| Example 4 | Modified polymer B | Hydrated silica A | X1 | 128 | 92 |
| Comp. Example 1 | Modified polymer A | Hydrated silica C | X1 | 100 | 100 |
| Comp. Example 2 | Modified polymer B | Hydrated silica C | X1 | 105 | 105 |
| Comp. Example 3 | Modified polymer D | Hydrated silica C | X1 | 106 | 106 |
| Comp. Example 4 | Polymer I | Hydrated silica C | X1 | 100 | 100 |
| Comp. Example 5 | Polymer I | Hydrated silica A | X1 | 115 | 115 |

TABLE 5

|  | Conditions | | | Evaluation | |
| --- | --- | --- | --- | --- | --- |
|  | Type of polymer | Type of hydrated silica | Blend prescription | Wear resistance | Rolling resistance |
| Example 5 | Modified polymer E | Hydrated silica B | X2 | 120 | 74 |
| Example 6 | Modified polymer F | Hydrated silica B | X2 | 149 | 59 |
| Example 7 | Modified polymer G | Hydrated silica B | X2 | 118 | 72 |
| Example 8 | Modified polymer H | Hydrated silica B | X2 | 112 | 82 |
| Example 9 | Modified polymer E | Hydrated silica B | X2 | 101 | 87 |
| Comp. Example 6 | Modified polymer E | Hydrated silica C | X2 | 100 | 100 |
| Comp. Example 7 | Modified polymer F | Hydrated silica C | X2 | 105 | 80 |
| Comp. Example 8 | Modified polymer G | Hydrated silica C | X2 | 100 | 97 |
| Comp. Example 9 | Modified polymer H | Hydrated silica C | X2 | 97 | 116 |
| Comp. Example 10 | Modified polymer J | Hydrated silica C | X2 | 92 | 128 |
| Comp. Example 11 | Modified polymer J | Hydrated silica B | X2 | 93 | 102 |

It is understood from the results of Table 4 and Table 5 that the test tires using the rubber compositions of Examples 1 to 9 exhibit better rolling resistance and wear resistance, as compared with the test tires of Comparative Examples 1 to 11.

REFERENCE SIGNS LIST

A: Micropore having substantially cylindrical configuration
B: Micropore having ink bottle-shaped configuration
$M_a$: Diameter of opening of type A micropore at the outer surface of a particle
$M_b$: Diameter of opening of type B micropore at the outer surface of a particle
$R_a$: Inner diameter of type A micropore at the interior of the particle
$R_b$: Inner diameter of type B micropore at the interior of the particle
C: Mercury charge curve
D: Mercury discharge curve
M1: Diameter of opening exhibiting the maximum value of mercury charge rate when pressure is increased
M2: Diameter of opening exhibiting the maximum value of mercury discharge rate when pressure is decreased
IB: Ink bottle-shaped micropore index

The invention claimed is:

1. A rubber composition for a tire comprising:
a rubber component; and
a hydrated silica having particles each provided with micropores with openings in the range of $1.2 \times 10^5$ nm to 6 nm formed at outer surface of the particle,
wherein the rubber component contains a modified polymer reactive to the hydrated silica, and
in measurement according to a mercury press-in method using a mercury porosimeter of the hydrated silica, provided that:
M1 (nm) represents diameter of the opening exhibiting the maximum value of mercury charge rate when pressure is increased from 1 PSI to 32000 PSI;
M2 (nm) represents diameter of the opening exhibiting the maximum value of mercury discharge rate when pressure is decreased from 32000 PSI to 1 PSI;
IB represents ink bottle-shaped micropore index;

$$IB = M2 - M1 \quad (X);$$

CTAB ($m^2/g$) represents specific surface area by cetyltrimethylammonium bromide adsorption;
weight loss on ignition (mass %) represents weight loss when the hydrated silica is heated at 750° C. for 3 hours; and
weight loss on heating (mass %) represents weight loss when the hydrated silica is heated at 105° C. for 2 hours,
IB and CTAB satisfy following formula (I) and formula (II) and weight loss on ignition and weight loss on heating satisfy formula (III), $$IB \leq -0.56 \times CTAB + 110.4 \text{ (when CTAB} \leq 140) \quad (I)$$

$$IB \leq -0.20 \times CTAB + 60.0 \text{ (when CTAB} > 140) \quad (II)$$

(weight loss on ignition−weight loss on heating)≥3.2 (mass %)     (III-1').

2. The rubber composition for a tire of claim 1, wherein a specific surface area by cetyltrimethylammonium bromide adsorption (CTAB) of the hydrated silica is in the range of 50 $m^2/g$ to 300 $m^2/g$.

3. The rubber composition for a tire of claim 1, wherein the modified polymer is a modified conjugated diene-based polymer obtained by: preparing a conjugated diene-based polymer having a metal-binding active site by anionic polymerization of a diene-based monomer and optionally other monomers in a hydrocarbon solvent using an alkali metal initiator or an alkali earth metal initiator; and reacting the metal-binding active site of the conjugated diene-based polymer with a hydrocarbyloxy silane compound.

4. The rubber composition for a tire of claim 3, wherein the modified conjugated diene-based polymer has a functional group introduced thereto, the functional group being at least one functional group selected from hydroxysilyl group, alkoxysilyl group, trialkylsilyl group, amino group, and a halogen atom.

5. The rubber composition for a tire of claim 4, wherein the functional group is selected from alkoxysilyl group and amino group.

6. The rubber composition for a tire of claim 1, wherein the modified polymer is a modified conjugated diene polymer having at a terminal end of a molecule thereof a silanol group and a functional group facilitating a reaction between the silanol group and the hydrated silica.

7. The rubber composition for a tire of claim 6, wherein the modified conjugated diene polymer is obtained by a process of preparing a conjugated diene polymer having an active site and reacting the active site of the conjugated diene polymer with an organic silane compound represented by general formula (XIII) or general formula (XIV),

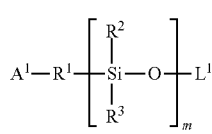

(XIII)

in general formula (XIII), $R^1$ is a single bond or a $C_{1-20}$ divalent hydrocarbon group; $R^2$ and $R^3$ each independently represent a hydrogen atom or a $C_{1-20}$ monovalent hydrocarbon group; $—OL^1$ represents a hydolyzable functional group capable of generating, together with Si, a silanol group through hydrolysis thereof; $A^1$ represents a functional group capable of coupling the organic silane compound with the conjugated diene polymer through addition reaction or substitution reaction at the active site of the conjugated diene polymer and facilitating, after the coupling reaction, a reaction between the silanol group and the hydrated silica as a reinforcing filler; and m is an integer in the range of 1 to 10,

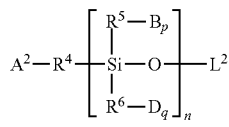

(XIV)

in general formula (XIV), $R^4$ is a single bond or a $C_{1-20}$ hydrocarbon group; $R^5$ and $R^6$ each independently represent a single bond, a hydrogen atom or a $C_{1-20}$ hydrocarbon group; $—OL^2$ represents a hydolyzable functional group capable of generating, together with Si, a silanol group through hydrolysis thereof; $A^2$ represents a functional group reactive to the active site or a functional group capable of coupling the organic silane compound with the conjugated diene polymer through addition reaction or substitution reaction at the active site of the conjugated diene polymer; B and D each independently represent a group including at least one functional group facilitating a reaction between the silanol group and the hydrated silica as a reinforcing filler; p and q each independently represent an integer in the range of 0 to 5, provided that (p+q)≥1; and n is an integer in the range of 1 to 10.

8. The rubber composition for a tire of claim 7, wherein the modified conjugated diene polymer is represented by general formula (XI) or general formula (XII),

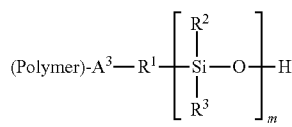

(XI)

in general formula (XI), $R^1$ is a single bond or a $C_{1-20}$ divalent hydrocarbon group; $R^2$ and $R^3$ each independently represent a hydrogen atom or a $C_{1-20}$ monovalent hydrocarbon group; $A^3$ represents a functional group facilitating a reaction between the silanol group and the hydrated silica; and m is an integer in the range of 1 to 10,

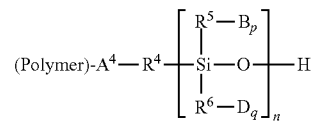

(XII)

in general formula (XIV), $R^4$ is a single bond or a $C_{1-20}$ hydrocarbon group; $R^5$ and $R^6$ each independently represent a single bond, a hydrogen atom or a $C_{1-20}$ hydrocarbon group; $A^4$ represents a single bond, a $C_{1-20}$ hydrocarbon group or a functional group facilitating a reaction between the silanol group and the hydrated silica; B and D each independently represent a group including at least one functional group facilitating a reaction between the silanol group and the hydrated silica; p and q each independently represent an integer in the range of 0 to 5, provided that (p+q)≥1; and n is an integer in the range of 1 to 10.

9. The rubber composition for a tire of claim 8, wherein in general formulae (XI) and (XII) the functional group $A^3$ and the functional group $A^4$, each facilitating a reaction between the silanol group and the hydrated silica, each independently represent at least one type of divalent functional group selected from the group consisting of: a divalent functional group having at least one type of bond selected from ether bond, thioether bond, urethane bond, thiourethane bond, imino bond, and amido bond; and a divalent functional group derived from a functional group selected from nitrile group, pyridyl group, N-alkylpyrrolidonyl group, N-alkylilrlidazolyl group, N-alkylpyrazolyl group, ketone group, thioketone group, aldehyde group, thioaldehyde group, a residual group of isocyanuric acid triester, a residual group of $C_{1-20}$ carboxylic acid hydrocarbyl ester or $C_{1-20}$ thiocarboxylic acid hydrocarbyl ester, a residual group of $C_{1-20}$ carboxylic acid metal salt or $C_{1-20}$ thiocarboxylic acid metal salt, a residual group of $C_{1-20}$ carboxylic acid anhydride, a residual group of $C_{1-20}$ carboxylic acid halide, and a residual group of $C_{1-20}$ carbonic acid dihydrocarbyl ester.

10. The rubber composition for a tire of claim 8, wherein in general formula (XII) B and D, each including at least one functional group facilitating a reaction between the silanol group and the hydrated silica, each independently represent at least one type of functional group selected from the group consisting of primary amino group, secondary amino group, protected primary/secondary amino group, tertiary amino group, cyclic amino group, oxazolyl group, imidazolyl group, aziridinyl group, ketone group, thioketone group, aldehyde group, thioaldehyde group, thioamido group, epoxy group, thioepoxy group, iscyanate group, thioisocyanate group, nitrile group, pyridyl group, N-alkylpyrrolidonyl group, N-alkylimidazolyl group, N-alkylpyrazolyl group, imino group, amido group, ketimine group, a residual group of imine, a residual group of isocyanuric acid triester, a residual group of $C_{1-20}$ carboxylic acid hydrocarbyl ester or $C_{1-20}$ thiocarboxylic acid hydrocarbyl ester, a residual group of $C_{1-20}$ carboxylic a metal salt or $C_{1-20}$ thiocarboxylic acid metal salt, a residual group of carboxylic acid anhydride, a residual group of $C_{1-20}$ carboxylic acid halide, and a residual group of $C_{1-20}$ carbonic acid dihydrocarbyl ester, and a functional group represented by general formula: -E-F-G, wherein E represents imino group, divalent group of imine, divalent residual group of pyridine or divalent residual group of amino, F represents $C_{1-20}$ alkylene group, phenylene group or $C_{8-20}$ aralkylene group, and G represents primary amino group, secondary amino group, protected primary/secondary amino group, tertiary amino group, cyclic amino group, oxazolyl group, imidazolyl group, aziridinyl group, ketimine group, nitrile group, amido group, pyridine group, isocyanate group or thioisocyanate group.

11. The rubber composition for a tire of claim 8, wherein the conjugated diene polymer constituting the modified conjugated diene polymer is polybutadiene, polyisoprene, butadiene-isoprene copolymer, styrene-butadiene copolymer, styrene-isoprene copolymer, or styrene-isoprene-butadiene terpolymer.

12. A cross-linked rubber composition subjecting the rubber composition of claim 1 to a crosslinking process.

13. A tire, using as a material the rubber composition of (1) above or the cross-linked rubber composition of claim 12.

* * * * *